US012812122B2

(12) United States Patent
Tan et al.

(10) Patent No.: US 12,812,122 B2
(45) Date of Patent: Nov. 24, 2026

(54) IMAGE ENCODING/DECODING METHOD, METHOD FOR TRANSMITTING BITSTREAM, AND RECORDING MEDIUM STORING BITSTREAM

(71) Applicant: LG Electronics Inc., Seoul (KR)

(72) Inventors: Hendry Tan, Seoul (KR); Jung Hak Nam, Seoul (KR); Jaehyun Lim, Seoul (KR); Hyeong Moon Jang, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/347,117

(22) Filed: Oct. 1, 2025

(65) Prior Publication Data

US 2026/0032250 A1 Jan. 29, 2026

Related U.S. Application Data

(63) Continuation of application No. PCT/KR2024/004549, filed on Apr. 5, 2024.

(60) Provisional application No. 63/457,407, filed on Apr. 6, 2023.

(51) Int. Cl.

| | |
|---|---|
| ***H04N 19/132*** | (2014.01) |
| ***H04N 19/172*** | (2014.01) |
| ***H04N 19/70*** | (2014.01) |
| ***H04N 19/80*** | (2014.01) |

(52) U.S. Cl.
CPC ......... *H04N 19/132* (2014.11); *H04N 19/172* (2014.11); *H04N 19/70* (2014.11); *H04N 19/80* (2014.11)

(58) Field of Classification Search
CPC .... H04N 19/172; H04N 19/132; H04N 19/70; H04N 19/80
See application file for complete search history.

(56) References Cited

U.S. PATENT DOCUMENTS

| | | | | |
|---|---|---|---|---|
| 2020/0382793 | A1 | 12/2020 | Gao et al. | |
| 2023/0328292 | A1* | 10/2023 | Chujoh | H04N 19/80 375/240.26 |
| 2024/0223764 | A1* | 7/2024 | Wang | H04N 19/59 |
| 2025/0218051 | A1* | 7/2025 | Wang | H04N 19/86 |

FOREIGN PATENT DOCUMENTS

| | | | |
|---|---|---|---|
| EP | 4161072 | A1 | 4/2023 |
| WO | 2022258356 | A1 | 12/2022 |
| WO | 2023048500 | A1 | 3/2023 |

OTHER PUBLICATIONS

International Search Report in International Appln. No. PCT/KR2024/004549, mailed on Jul. 5, 2024, 12 pages (with English translation).
McCarthy et al., "Improvements under consideration for neural network post filter SEI messages," JVET-AC2032-v2, Joint Video Experts Team (JVET) of ITU-T SG 16 WP 3 and ISO/IEC JTC 1/SC 29, 29th Meeting, by teleconference, Jan. 11-20, 2023, 27 pages.

* cited by examiner

*Primary Examiner* — Joseph G Ustaris
(74) *Attorney, Agent, or Firm* — Fish & Richardson P.C.

(57) ABSTRACT

An image encoding/decoding method and device are provided. The image decoding method according to the present disclosure may comprise the steps of: acquiring size information of a current picture; and resampling an input picture of a neural-network post-filter (NNPF) on the basis of the size information.

2 Claims, 7 Drawing Sheets

IMAGE ENCODING/DECODING METHOD, METHOD FOR TRANSMITTING BITSTREAM, AND RECORDING MEDIUM STORING BITSTREAM

CROSS-REFERENCE TO RELATED APPLICATIONS

This application is a continuation of International Application No. PCT/KR2024/004549, filed on Apr. 5, 2024, which claims the benefit of earlier filing date and right of priority to U.S. Provisional Application No. 63/457,407, filed on Apr. 6, 2023. The disclosures of the prior applications are incorporated by reference in their entirety.

TECHNICAL FIELD

The present disclosure relates to a method of image encoding/decoding, a method of transmitting a bitstream, and a recording medium storing the bitstream, and more particularly, to a method of processing a neural-network post-filter.

BACKGROUND

Recently, the demand for high-resolution and high-quality images, such as High Definition (HD) images and Ultra High Definition (UHD) images, has been increasing in various fields. As image data becomes high-resolution and high-quality, the amount of transmitted information or bit rate increases relative to conventional image data. The increase in transmitted information or bit rate amount leads to an increase in transmission costs and storage costs.

Accordingly, a high-efficiency image compression technology is required to effectively transmit, store, and reproduce the information of high-resolution and high-quality images.

SUMMARY

The present disclosure is to provide an image encoding/decoding method and apparatus with improved encoding/decoding efficiency.

The present disclosure is to provide an image encoding/decoding method and apparatus for resampling an input picture of an NNPF.

The present disclosure is to provide an image encoding/decoding method and apparatus for resampling an input picture based on the input picture of an NNPF and the current picture having different sizes.

The present disclosure is to provide a non-transitory computer-readable recording medium for storing a bitstream generated by an image encoding method according to the present disclosure.

The present disclosure is to provide a non-transitory computer-readable recording medium for storing a bitstream which is received and decoded by the image decoding apparatus according to the present disclosure and used for image reconstruction.

The present disclosure is to provide a method for transmitting a bitstream which is generated by the image encoding method according to the present disclosure.

The technical problems to be achieved in the present disclosure are not limited to the technical problems described above, and other technical problems not described may be clearly understood by those of ordinary skill in the art from the following descriptions.

According to an embodiment of the present disclosure, an image decoding method performed by an image decoding apparatus may include obtaining size information of a current picture and resampling an input picture of a neural-network post-filter (NNPF) based on the size information.

According to an embodiment of the present disclosure, the resampling may be performed based on the current picture size and the input picture size being different.

According to an embodiment of the present disclosure, the resampling may be performed based on the number of input pictures of the NNPF being two or more.

According to an embodiment of the present disclosure, the method may further include obtaining an NNPF supplemental enhancement information (SEI) message, and based on the NNPF SEI message being applied to the current picture, the NNPF may be determined based on a neural-network post-filter activation (NNPFA) SEI message included in the NNPF SEI message.

According to an embodiment of the present disclosure, an image encoding method performed by an image encoding apparatus may include generating size information by comparing the size of an input picture of a neural-network post-filter (NNPF) with the size of a current picture, and encoding the size information.

According to an embodiment of the present disclosure, a computer-readable recording medium may store a bitstream generated by the image encoding method.

According to an embodiment of the present disclosure, in a method of transmitting a bitstream generated by the image encoding method, the image encoding method may include generating size information by comparing the size of an input picture of a neural-network post-filter (NNPF) with the size of a current picture, and encoding the size information.

According to the present disclosure, an image encoding/decoding method and apparatus with improved encoding/decoding efficiency may be provided.

According to the present disclosure, an image encoding/decoding method and apparatus for resampling an input picture of an NNPF may be provided.

According to the present disclosure, an image encoding/decoding method and apparatus for resampling an input picture based on the input picture of an NNPF and the current picture having different sizes may be provided.

According to the present disclosure, a non-transitory computer-readable recording medium for storing a bitstream generated by an image encoding method according to the present disclosure may be provided.

According to the present disclosure, a non-transitory computer-readable recording medium for storing a bitstream which is received and decoded by the image decoding apparatus according to the present disclosure and used for image reconstruction may be provided.

According to the present disclosure, a method of transmitting a bitstream generated by the image encoding method may be provided.

The effects obtainable from the present disclosure are not limited to the effects described above, and other effects not described may be clearly understood by those of ordinary skill in the art from the following descriptions.

DETAILED DESCRIPTION

Figure 1:
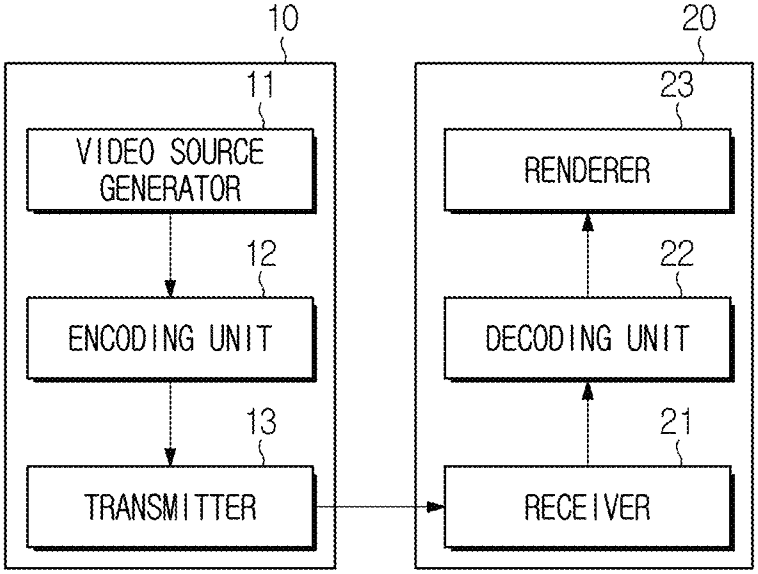
FIG. 1 shows a schematic diagram of a video coding system to which an embodiment according to the present disclosure may be applied.

Hereinafter, embodiments of the present disclosure will be described in detail by referring to the attached drawings for those of ordinary skill in the art to easily implement them. However, the present disclosure may be implemented in various different forms and is not limited to the embodiments described herein.

In describing embodiments of the present disclosure, detailed explanations of well-known configurations or functions are omitted when they are deemed to obscure the main point of the present disclosure. Additionally, parts irrelevant to the description of the present disclosure are omitted from the drawings, and similar reference numerals have been assigned to similar parts.

In the present disclosure, when a certain component is described as being "connected," "coupled," or "linked" to another component, this may include not only a direct connection but also an indirect connection where another component may exist in the middle. Additionally, when a certain component is described as "including" or "having" another component, this means that, unless explicitly stated otherwise, it does not exclude other components but may further include additional components.

In the present disclosure, the terms first, second, etc. are used solely for the purpose of distinguishing one component from another and do not limit the order or importance of the components unless explicitly stated otherwise. Accordingly, a first component in one embodiment may be referred to as a second component in another embodiment, and similarly, a second component in one embodiment may be referred to as a first component in another embodiment within the range of the present disclosure.

In the present disclosure, distinguishable components are described to clearly explain their respective characteristics and do not necessarily mean that the components are separate. In other words, a plurality of components may be integrated into a single hardware or software unit, or a single component may be distributed across multiple hardware or software units. Accordingly, without explicitly describing them, such integrated or distributed embodiments are also included in the range of the present disclosure.

In the present disclosure, the components described in various embodiments do not necessarily mean essential components, and some may be optional components. Accordingly, embodiments composed of a subset of the components described in one embodiment are also included in the range of the present disclosure. Additionally, embodiments that include additional components beyond those described in various embodiments are also included in the range of the present disclosure.

The present disclosure relates to the encoding and decoding of images, and the terms used herein may have the ordinary meanings commonly used in the field of technology to which this disclosure belongs unless the terms are newly defined in the present disclosure.

In the present disclosure, "picture" generally refers to a unit representing a single image at a specific point in time. A slice/tile is an encoding unit that constitutes a part of a picture, and a picture may be composed of one or more slices/tiles. Additionally, a slice/tile may include one or more coding tree units (CTUs).

In the present disclosure, "pixel" or "pel" may refer to the smallest unit that constitutes one picture (or image). Additionally, the term "sample" may be used as a corresponding term for a pixel. A sample may generally represent a pixel or the value of a pixel and may indicate only the pixel/pixel value of a luma component or only the pixel/pixel value of a chroma component.

In the present disclosure, "unit" may refer to a basic unit of image processing. A unit may include at least one of a specific area of a picture or information related to the area. Depending on the context, the term "unit" may be used interchangeably with "sample array," "block," "area," etc. In general, an M×N block may include a set (or array) of samples (or a sample array) or a set (or array) of transform coefficients, consisting of M columns and N rows.

In the present disclosure, the term "current block" may refer to one of "current coding block", "current coding unit", "encoding target block", "decoding target block", or "processing target block". When prediction is performed, "current block" may refer to "current prediction block" or "prediction target block". When transform (inverse transform)/quantization (dequantization) is performed, "current block" may refer to "current transform block" or "transform target block". When filtering is performed, "current block" may refer to "filtering target block".

In the present disclosure, unless explicitly stated as a chroma block, the term "current block" may refer to a block that includes both a luma component block and a chroma component block or may refer to "the luma block of the current block". The luma component block of the current block may be explicitly expressed with terms such as "luma block" or "current luma block", clearly indicating it as a luma component block. Additionally, the chroma component block of the current block may be explicitly expressed with terms such as "chroma block" or "current chroma block", clearly indicating it as a chroma component block.

In the present disclosure, "/" and "," may refer to "and/or". For example, "A/B" and "A, B" may refer to "A and/or B". Additionally, "A/B/C" and "A, B, C" may refer to "at least one of A, B, and/or C".

In the present disclosure, "or" may refer to "and/or". For example, "A or B" may mean 1) "A" only, 2) "B" only, or 3) "A and B." Alternatively, in the present disclosure, "or" may also mean "additionally or alternatively".

Overview of the Video Coding System

FIG. 1 shows a schematic diagram of a video coding system to which an embodiment according to the present disclosure may be applied.

A video coding system according to an embodiment may include an encoder apparatus 10 and a decoder apparatus 20. The encoder apparatus 10 may transmit encoded video and/or image information or data to the decoder apparatus 20 through a digital storage medium or network in the form of a file or streaming.

An encoder apparatus 10 according to an embodiment may include a video source generator 11, an encoder 12, and a transmitter 13. A decoder apparatus 20 according to an embodiment may include a receiver 21, a decoder 22, and a renderer 23. The encoder 12 may be referred to as a video/image encoder, and the decoder 22 may be referred to as a video/image decoder. The transmitter 13 may be included in the encoder 12. The receiver 21 may be included in the decoder 22. The renderer 23 may include a display, and the display may be configured as a separate device or external component.

The video source generator 11 may obtain a video/an image through a process of capturing, synthesizing, or generating a video/an image. The video source generator 11 may include a video/an image capture device and/or a video/an image generation device. The video/image capture device may include, for example, one or more cameras, a video/an image archive containing previously captured video/image, etc. The video/image generation device includes, for example, a computer, tablet, or smartphone, and may (electronically) generate a video/an image. For example, virtual video/image may be generated through a computer, etc., and in this case, the video/image capturing process may be replaced by the process of generating related data.

The encoder 12 may encode the input video/image. The encoder 12 may perform a series of procedures such as prediction, transform, quantization, etc. for compression and encoding efficiency. The encoder 12 may output the encoded data (encoded video/image information) in the form of a bitstream.

The transmitter 13 may obtain the encoded video/image information or data output in the form of a bitstream and transmit it to the receiver 21 of the decoder apparatus 20 or another external object through a digital storage medium or network, in the form of a file or streaming. The digital storage medium may include various storage media such as USB, SD, CD, DVD, Blu-ray, HDD, SSD, etc. The transmitter 13 may include an element for generating media files through a predetermined file format and element for transmission over broadcast/communication networks. The transmitter 13 may be provided as a separate transmission apparatus from the encoder 12, in which case the transmission apparatus may include at least one processor for obtaining the encoded video/image information or data in bitstream form and a transmitter for delivering it in the form of file or streaming. The receiver 21 may extract/receive the bitstream from the storage medium or network and transmit it to decoder 22.

The decoder 22 may decode the video/image by performing a series of procedures such as dequantization, inverse transform, prediction, etc. corresponding to the operations of the encoder 12.

The renderer 23 may render the decoded video/image. The rendered video/image may be displayed through the display unit.

Overview of the Image Encoding Apparatus

Figure 2:
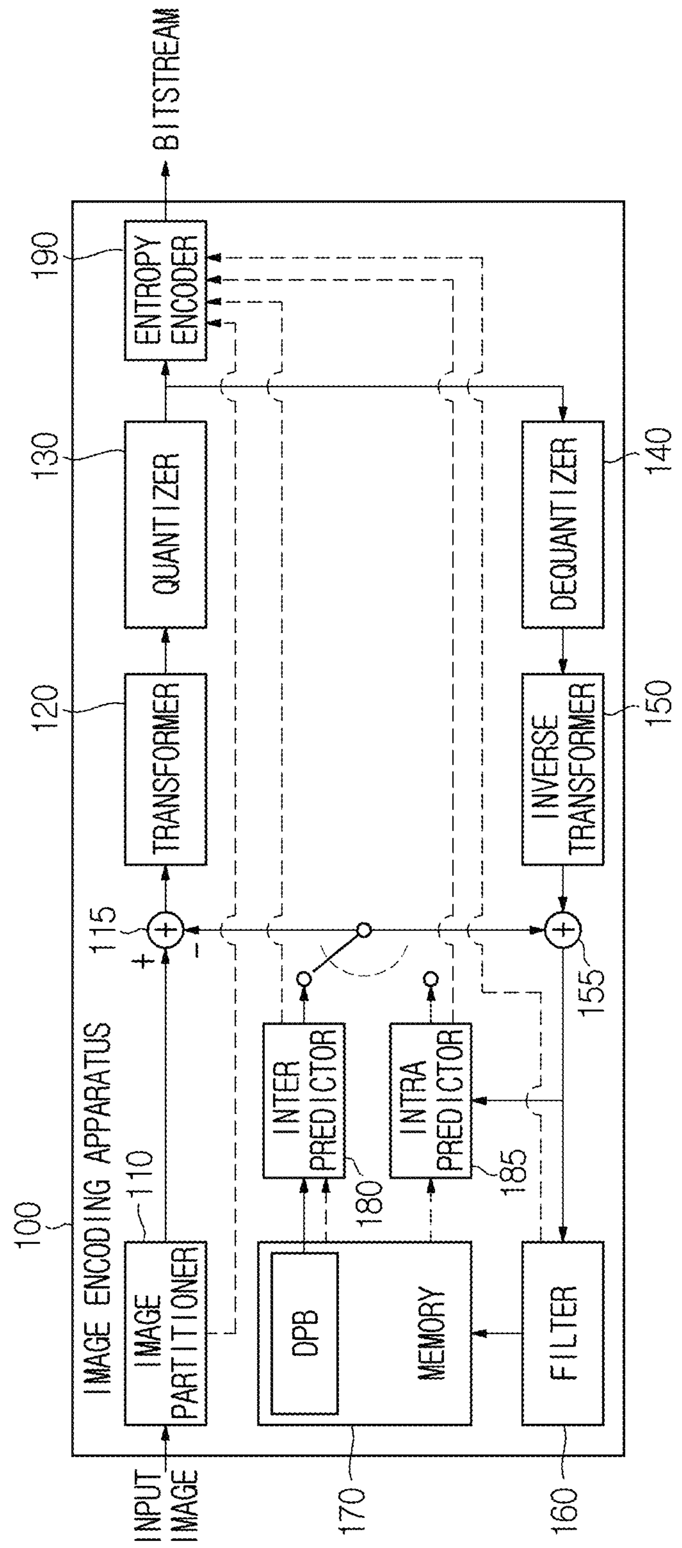
FIG. 2 shows a schematic diagram of an image encoding apparatus to which an embodiment according to the present disclosure may be applied.

FIG. 2 shows a schematic diagram of an image encoding apparatus to which an embodiment according to the present disclosure may be applied.

As described in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185, and an entropy encoder 190. The inter predictor 180 and the intra predictor 185 may collectively be referred to as a "predictor." The transformer 120, the quantizer 130, the dequantizer 140, and the inverse transformer 150 may be included in a residual processor. The residual processor may further include the subtractor 115.

All or at least some of the multiple components constituting the image encoding apparatus 100 may be implemented as a single hardware component (i.e., an encoder or a processor), depending on the embodiment. Additionally, the memory 170 may include a decoded picture buffer (DPB) and may be implemented by a digital storage medium.

The image partitioner 110 may partition the input image (or picture, frame) input to the image encoding apparatus 100 into at least one processing unit. As an example, the processing unit may be referred to as a coding unit (CU). A coding unit may be obtained by recursively partitioning a coding tree unit (CTU) or a largest coding unit (LCU) according to a quad-tree, binary-tree, or ternary-tree (QT/BT/TT) structure. For example, a coding unit may be divided into a deeper-depth coding unit based on a quad-tree structure, a binary-tree structure, and/or a ternary-tree structure. For partitioning a coding unit, the quad-tree structure may be applied first, followed by the binary-tree structure and/or the ternary-tree structure. The coding procedure according to the present disclosure may be performed based on the final coding unit, which is not further partitioned. The largest coding unit may be used directly as the final coding unit, or a deeper-depth coding unit obtained by partitioning the largest coding unit may be used as the final coding unit. Here, the coding procedure may include a procedure such as prediction, transform, and/or reconstruction, which will be described later. As another example, the processing unit for the coding procedure may be a prediction unit (PU) or a transform unit (TU). The prediction unit and the transform unit may each be divided or partitioned from the final coding unit. The prediction unit may be a unit for sample prediction, and the transform unit may be a unit for deriving a transform coefficient and/or deriving a residual signal from a transform coefficient.

The predictor (inter predictor 180 or intra predictor 185) may perform prediction for a target block (current block) and generate a predicted block that includes prediction samples for the current block. The predictor may determine whether intra prediction or inter prediction is applied to the current block or coding unit (CU). The predictor may generate various information related to the prediction of the current block and transmit it to the entropy encoder 190. The prediction-related information may be encoded by the entropy encoder 190 and may be output in the form of a bitstream.

The intra predictor 185 may predict the current block by referring to samples within the current picture. The referenced samples may be located in the neighboring area of the current block or may be located farther away, depending on the intra prediction mode and/or intra prediction method. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes, depending on the granularity of the prediction direction. However, this is an example, and a greater or fewer number of directional prediction modes may be used depending on the configuration. The intra predictor 185 may also determine the prediction mode applied to the current block by using the prediction mode applied to neighboring block.

The inter predictor 180 may derive a predicted block for the current block based on a reference block (reference sample array) specified by a motion vector on a reference picture. To reduce the amount of motion information transmitted in the inter prediction mode, motion information may be predicted at the block, sub-block, or sample level based on the correlation of motion information between the neighboring block and the current block. The motion information may include a motion vector and a reference picture index. The motion information may further include information on the inter prediction direction (i.e. L0 prediction, L1 prediction, Bi prediction, etc.). In inter prediction, neighboring block may include spatial neighboring block present within the current picture and temporal neighboring block present in the reference picture. The reference picture containing the reference block and the reference picture containing the temporal neighboring block may be the same or different. The temporal neighboring block may be referred to as a collocated reference block or a collocated coding unit (colCU). The reference picture containing the temporal neighboring block may be referred to as a collocated picture (colPic). For example, the inter predictor 180 may construct a motion information candidate list based on neighboring blocks and generate information indicating which candidate is used to derive the motion vector and/or reference picture index of the current block. Inter prediction may be performed based on various prediction modes, and for example, in the skip mode and merge mode, the inter predictor 180 may use the motion information of neighboring block as the motion information of the current block. In skip mode, unlike merge mode, residual signal may not be transmitted. In the motion vector prediction (MVP) mode, the motion vector of a neighboring block may be used as a motion vector predictor, and the motion vector of the current block may be signaled by encoding the motion vector difference and an indicator for the motion vector predictor. The motion vector difference may refer to the difference between the motion vector of the current block and the motion vector predictor.

The predictor may generate a prediction signal based on various prediction methods and/or prediction techniques described later. For example, the predictor may apply intra prediction or inter prediction for the prediction of the current block, and it may also apply both intra prediction and inter prediction simultaneously. The prediction method that applies intra prediction and inter prediction simultaneously for the prediction of the current block may be referred to as combined inter and intra prediction (CIIP). Additionally, the predictor may perform intra block copy (IBC) for the prediction of the current block. Intra block copy may be used, for example, for screen content coding (SCC), etc. in applications such as game content image/video coding. IBC is a method of predicting the current block by using a pre-reconstructed reference block within the current picture, located at a predetermined distance from the current block. When IBC is applied, the position of the reference block within the current picture may be encoded as a vector (block vector) corresponding to the predetermined distance. IBC basically performs prediction within the current picture, but since it derives a reference block within the current picture, it may operate similarly to inter prediction. In other words, IBC may use at least one of the inter prediction methods described in the present disclosure.

The prediction signal generated by the predictor may be used to generate a reconstructed signal or to generate a residual signal. The subtractor 115 may generate a residual signal (residual block, residual sample array) by subtracting the prediction signal (predicted block, predicted sample array) output from the predictor from the input image signal (original block, original sample array). The generated residual signal may be transmitted to the transformer 120.

The transformer 120 may generate transform coefficients by applying a transform method to the residual signal. For example, the transform method may include at least one of Discrete Cosine Transform (DCT), Discrete Sine Transform (DST), Karhunen-Loeve Transform (KLT), Graph-Based Transform (GBT), or Conditionally Non-linear Transform (CNT). Here, GBT refers to a transform obtained from a graph when the relationship information between pixels is represented as a graph. CNT refers to a transform obtained based on a prediction signal generated by using all previously reconstructed pixels. The transform process may be applied to a pixel block of the same square size or to a non-square variable-sized block.

The quantizer 130 may quantize the transform coefficients and transmit them to the entropy encoder 190. The entropy encoder 190 may encode the quantized signal (information on the quantized transform coefficients) and output it as a bitstream. The information on the quantized transform coefficients may be referred to as residual information. The quantizer 130 may rearrange the block-shaped quantized transform coefficients into a one-dimensional vector based on a coefficient scan order and may generate the information on the quantized transform coefficients based on the one-dimensional vector of quantized transform coefficients.

The entropy encoder 190 may perform various encoding methods, such as exponential Golomb, context-adaptive variable length coding (CAVLC), or context-adaptive binary arithmetic coding (CABAC). The entropy encoder 190 may encode not only the quantized transform coefficients but also information necessary for video/image reconstruction (i.e., values of syntax elements) either together or separately with the quantized transform coefficients. The encoded information (i.e., encoded video/image information) may be transmitted or stored in the form of a bitstream in network abstraction layer (NAL) unit. The video/image information may further include information on various parameter sets, such as an adaptation parameter set (APS), a picture parameter set (PPS), a sequence parameter set (SPS), or a video parameter set (VPS). Additionally, the video/image information may further include general constraint information. The signaling information, transmitted information, and/or syntax elements described in the present disclosure may be included in the bitstream by being encoded through the above-described encoding process.

The bitstream may be transmitted through a network or stored in a digital storage medium. Here, the network may include a broadcast network and/or a communication network, etc., and the digital storage medium may include various storage media such as USB, SD, CD, DVD, Blu-ray, HDD, SSD, etc.

A transmitter (not shown) for transmitting the signal output from the entropy encoder 190 and/or a storage unit (not shown) for storing the signal may be provided as an internal/external element of the image encoding apparatus 100, or the transmitter may be configured as a component of the entropy encoder 190.

The quantized transform coefficients output from the quantizer 130 may be used to generate a residual signal. For example, a residual signal (residual block or residual samples) may be reconstructed by applying dequantization and inverse transform to the quantized transform coefficients through the dequantizer 140 and the inverse transformer 150.

The adder 155 may generate a reconstructed signal (reconstructed picture, reconstructed block, or reconstructed sample array) by adding the reconstructed residual signal to the prediction signal output from the inter predictor 180 or the intra predictor 185. When there is no residual for the target block, such as when the skip mode is applied, the predicted block may be used as the reconstructed block. The adder 155 may be referred to as a reconstructor or a reconstructed block generator. The generated reconstructed signal may be used for intra prediction of the next target block within the current picture and, as described later, may also be used for inter prediction of the next picture after undergoing filtering.

The filter 160 may apply filtering to the reconstructed signal to enhance subjective/objective quality. For example, the filter 160 may apply various filtering methods to the reconstructed picture to generate a modified reconstructed picture, and the modified reconstructed picture may be stored in the memory 170, specifically in the DPB of the memory 170. The various filtering methods may include, for example, deblocking filtering, sample adaptive offset, adaptive loop filter, bilateral filter, etc. The filter 160 may generate various filtering-related information, as described later in the explanations of each filtering method, and may transmit it to the entropy encoder 190. The filtering-related information may be encoded by the entropy encoder 190 and output in the form of a bitstream.

The modified reconstructed picture transmitted to the memory 170 may be used as a reference picture in the inter predictor 180. When inter prediction is applied in this case, the image encoding apparatus 100 may avoid prediction mismatches between the image encoding apparatus 100 and the image decoding apparatus, and may improve encoding efficiency.

The DPB in the memory 170 may store the modified reconstructed picture for use as a reference picture in the inter predictor 180. The memory 170 may store the motion information of a block in the current picture where motion information has been derived (or encoded) and/or the motion information of blocks in already reconstructed pictures. The stored motion information may be transmitted to the inter predictor 180 for use as motion information of spatial neighboring block or temporal neighboring block. The memory 170 may store the reconstructed samples of reconstructed blocks in the current picture and transmit them to the intra predictor 185.

Overview of the Image Decoding Apparatus

Figure 3:
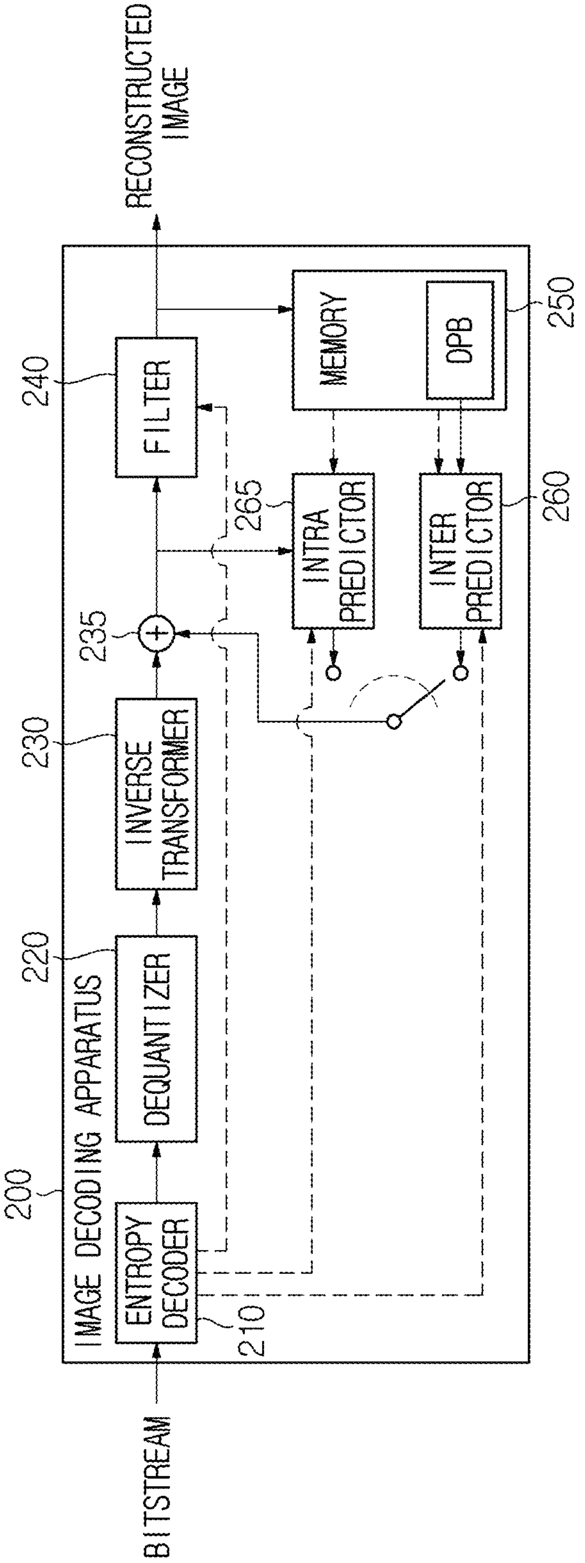
FIG. 3 shows a schematic diagram of an image decoding apparatus to which an embodiment according to the present disclosure may be applied.

FIG. 3 shows a schematic diagram of an image decoding apparatus to which an embodiment according to the present disclosure may be applied.

As shown in FIG. 3, the image decoding apparatus 200 may include an entropy decoder 210, a dequantizer 220, an inverse transformer 230, an adder 235, a filter 240, a memory 250, an inter predictor 260, and an intra predictor 265. The inter predictor 260 and the intra predictor 265 may collectively be referred to as a "predictor". The dequantizer 220 and the inverse transformer 230 may be included in a residual processor.

All or at least some of the multiple components constituting the image decoding apparatus 200 may be implemented as a single hardware component (i.e., a decoder or a processor), depending on the embodiment. Additionally, the memory 170 may include a DPB and may be implemented by a digital storage medium.

The image decoding apparatus 200, which receives a bitstream containing video/image information, may perform a process corresponding to the process performed by the image encoding apparatus 100 in FIG. 2 to reconstruct the image. For example, the image decoding apparatus 200 may perform decoding using the processing unit applied in the image encoding apparatus. Therefore, the processing unit for decoding may be, for example, a coding unit. The coding unit may be a coding tree unit or may be obtained by splitting a largest coding unit. Additionally, the reconstructed image signal decoded and output through the image decoding apparatus 200 may be played back through a playback device (not shown).

The image decoding apparatus 200 may receive a signal output from the image encoding apparatus in FIG. 2 in the form of a bitstream. The received signal may be decoded through the entropy decoder 210. For example, the entropy decoder 210 may parse the bitstream to extract the information necessary for image reconstruction (or picture reconstruction) (i.e., video/image information). The video/image information may further include information on various parameter sets, such as an adaptation parameter set (APS), a picture parameter set (PPS), a sequence parameter set (SPS), or a video parameter set (VPS). Additionally, the video/image information may further include general constraint information. The image decoding apparatus may additionally use information on the parameter set and/or the general constraint information to decode the image. The signaling information, received information, and/or syntax elements described in the present disclosure may be obtained from the bitstream by being decoded through the decoding process. For example, the entropy decoder 210 may decode the information in the bitstream based on coding methods such as exponential Golomb encoding, CAVLC, or CABAC, and may output a syntax element value necessary for image reconstruction and quantized values of a transform coefficient related to a residual. More specifically, the CABAC entropy decoding method may receive a bin corresponding to a syntax element in the bitstream, may determine a context model using the information of the decoding target syntax element, the decoding information of neighboring block and the decoding target block, or information of previously decoded symbol/bin, may predict the probability of bin occurrence according to the determined context model, and may perform arithmetic decoding of the bin to generate a symbol corresponding to each syntax element. In this case, the CABAC entropy decoding method may update the context model for the next symbol/bin context model using the decoded symbol/bin information after determining the context model. Among the decoded information from the entropy decoder 210, the prediction-related information may be provided to the predictor (inter predictor 260 and intra predictor 265), and the residual value which is entropy decoded by the entropy decoder 210, in other words, the quantized transform coefficients and related parameter information, may be input to the dequantizer 220. Additionally, among the decoded information from the entropy decoder 210, filtering-related information may be provided to the filter 240. Meanwhile, a receiver (not shown) that receives the signal output from the image encoding apparatus may be additionally configured as an internal/external element of the image decoding apparatus 200, or the receiver may be configured as a component of the entropy decoder 210.

Meanwhile, the image decoding apparatus according to the present disclosure may also be referred to as a video/image/picture decoding apparatus. The image decoding apparatus may include an information decoder (video/image/picture information decoder) and/or a sample decoder (video/image/picture sample decoder). The information decoder may include the entropy decoder 210, and the sample decoder may include at least one of the dequantizer 220, the inverse transformer 230, the adder 235, the filter 240, the memory 250, the inter predictor 260, or the intra predictor 265.

The dequantizer 220 may dequantize the quantized transform coefficients and output the transform coefficients. The dequantizer 220 may rearrange the quantized transform coefficients into a two-dimensional block. In this case, the rearrangement may be performed based on the coefficient scan order applied in the image encoding apparatus. The dequantizer 220 may perform dequantization on the quantized transform coefficients using quantization parameter (i.e., quantization step size information) and may obtain transform coefficients.

The inverse transformer 230 may perform an inverse transform on the transform coefficients to obtain a residual signal (residual block, or residual sample array).

The predictor may perform prediction for the current block and generate a predicted block that includes prediction samples for the current block. The predictor may determine whether intra prediction or inter prediction is applied to the current block based on the prediction-related information output from the entropy decoder 210 and may determine a specific intra/inter prediction mode (prediction method).

That the predictor may generate a prediction signal based on various prediction methods (techniques) which will be described later is the same as described in the explanation of the predictor in the image encoding apparatus 100.

The intra predictor 265 may predict the current block by referring to samples within the current picture. The explanation of the intra predictor 185 may also be applied in the same way to the intra predictor 265.

The inter predictor 260 may derive a predicted block for the current block based on a reference block (reference sample array) specified by a motion vector on a reference picture. In this case, to reduce the amount of motion information transmitted in the inter prediction mode, motion information may be predicted at the block, sub-block, or sample level based on the correlation of motion information between the neighboring block and the current block. The motion information may include a motion vector and a reference picture index. The motion information may further include information on the inter prediction direction (i.e., L0 prediction, L1 prediction, Bi prediction, etc.). In inter prediction, a neighboring block may include spatial neighboring block within the current picture and temporal neighboring block in the reference picture. For example, the inter predictor 260 may construct a motion information candidate list based on neighboring blocks and derive the motion vector and/or reference picture index of the current block based on the received candidate selection information. Inter prediction may be performed based on various prediction modes (methods), and the prediction-related information may include information indicating the inter prediction mode (method) applied to the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). When there is no residual for the target block, such as when the skip mode is applied, the predicted block may be used as the reconstructed block. The explanation of the adder 155 may also be applied in the same way to the adder 235. The adder 235 may be referred to as a reconstructor or a reconstructed block generator. The generated reconstructed signal may be used for intra prediction of the next target block within the current picture and as described later, may also be used for inter prediction of the next picture after undergoing filtering.

The filter 240 may apply filtering to the reconstructed signal to enhance subjective/objective quality. For example, the filter 240 may apply various filtering methods to the reconstructed picture to generate a modified reconstructed picture, and the modified reconstructed picture may be stored in the memory 250, specifically in the DPB of the memory 250. The various filtering methods may include, for example, deblocking filtering, sample adaptive offset, adaptive loop filter, bilateral filter, etc.

The (modified) reconstructed picture stored in the DPB of the memory 250 may be used as a reference picture in the inter predictor 260. The memory 250 may store the motion information of a block in the current picture where motion information has been derived (or decoded) and/or the motion information of blocks in already reconstructed picture. The stored motion information may be transmitted to the inter predictor 260 to be used as motion information of a spatial neighboring block or a temporal neighboring block. The memory 250 may store the reconstructed samples of reconstructed blocks in the current picture and transmit them to the intra predictor 265.

In this specification, the embodiments described for the filter 160, the inter predictor 180, and the intra predictor 185 of the image encoding apparatus 100 may be applied in the same or corresponding manner to the filter 240, the inter predictor 260, and the intra predictor 265 of the image decoding apparatus 200.

Neural-Network Post-Filter Characteristics (NNPFC)

The combination of Table 1 to Table 3 represents the NNPFC syntax structure.

TABLE 1

| | Descriptor |
|---|---|
| nn_post_filter_characteristics( payloadSize ) { | |
| nnpfc_purpose | u(16) |
| nnpfc_id | ue(v) |
| nnpfc_mode_idc | ue(v) |
| if( nnpfc_mode_idc = = 1 ) { | |
| while( !byte_aligned( ) ) | |
| nnpfc_reserved_zero_bit_a | u(1) |
| nnpfc_tag_uri | st(v) |
| nnpfc_uri | st(v) |
| } | |
| nnpfc_property_present_flag | u(1) |
| if( nnpfc_property_present_flag ) { | |
| nnpfc_base_flag | u(1) |
| /* input and output formatting */ | |
| nnpfc_num_input_pics_minus1 | ue(v) |
| if( ( nnpfc_purpose & 0x02 ) != 0 ) | |
| nnpfc_out_sub_c_flag | u(1) |
| if( ( nnpfc_purpose & 0x20 ) != 0 ) | |
| nnpfc_out_colour_format_idc | u(2) |
| if( ( nnpfc_purpose & 0x04 ) != 0 ) { | |
| nnpfc_pic_width_in_luma_samples | ue(v) |
| nnpfc_pic_height_in_luma_samples | ue(v) |
| } | |
| if( ( nnpfc_purpose & 0x08 ) != 0 ) { | |
| for( i = 0; i < nnpfc_num_input_pics_minus1; i++ ) | |
| nnpfc_interpolated_pics[ i ] | ue(v) |
| for( i = 0; i <= nnpfc_num_input_pics_minus1; i++ ) | |
| nnpfc_input_pic_output_flag[ i ] | u(1) |
| } | |
| nnpfc_component_last_flag | u(1) |
| nnpfc_inp_format_idc | ue(v) |
| if( nnpfc_inp_format_idc = = 1 ) { | |
| nnpfc_inp_tensor_luma_bitdepth_minus8 | ue(v) |

TABLE 2

| | |
|---|---|
| nnpfc_inp_tensor_chroma_bitdepth_minus8 | ue(v) |
| } | |
| nnpfc_inp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format_idc | ue(v) |
| if( nnpfc_out_format_idc = = 1 ) { | |
| nnpfc_out_tensor_luma_bitdepth_minus8 | ue(v) |
| nnpfc_out_tensor_chroma_bitdepth_minus8 | ue(v) |
| } | |
| nnpfc_out_order_idc | ue(v) |
| nnpfc_overlap | ue(v) |
| nnpfc_constant_patch_size_flag | u(1) |
| if( nnpfc_constant_patch_size_flag ) { | |
| nnpfc_patch_width_minus1 | ue(v) |
| nnpfc_patch_height_minus1 | ue(v) |
| } else { | |
| nnpfc_extended_patch_width_cd_delta_minus1 | ue(v) |
| nnpfc_extended_patch_height_cd_delta_minus1 | ue(v) |
| } | |
| nnpfc_padding_type | ue(v) |
| if( nnpfc_padding_type = = 4 ) { | |
| nnpfc_luma_padding_val | ue(v) |
| nnpfc_cb_padding_val | ue(v) |
| nnpfc_cr_padding_val | ue(v) |
| } | |
| nnpfc_complexity_info_present_flag | u(1) |
| if( nnpfc_complexity_info_present_flag ) { | |

TABLE 3

| | |
|---|---|
| nnpfc_parameter_type_idc | u(2) |
| if( nnpfc_parameter_type_idc != 2 ) | |
| nnpfc_log2_parameter_bit_length_minus3 | u(2) |
| nnpfc_num_parameters_idc | u(6) |
| nnpfc_num_kmac_operations_idc | ue(v) |
| nnpfc_total_kilobyte_size | ue(v) |
| } | |
| } | |
| /* ISO/IEC 15938-17 bitstream */ | |
| if( nnpfc_mode_idc = = 0 ) { | |
| while( !byte_aligned( ) ) | |
| nnpfc_reserved_zero_bit_b | u(1) |
| for( i = 0; more_data_in_payload( ); i++ ) | |
| nnpfc_payload_byte[ i ] | b(8) |
| } | |
| } | |

The NNPFC syntax structure of Table 1 to Table 3 may be signaled in the form of a supplemental enhancement information (SEI) message. An SEI message signaling the NNPFC syntax structure of Table 1 to Table 2 may be referred to as an NNPFC SEI message.

The NNPFC SEI message may specify a neural-network usable as a post-processing filter. The use of the specified post-processing filters for specific pictures may be indicated by using neural-network post-filter activation (NNPFA) SEI messages. Here, "post-processing filter" and "post-filter" may have the same meaning.

To use these SEI messages, the following variables may need to be defined.

The width and height of an input picture may be cropped in units of luma samples, and the width and height may be represented as CroppedWidth and CroppedHeight, respectively.

CroppedYPic[idx], which is the luma sample array of input pictures, and CroppedCbPic[idx] and CroppedCrPic[idx], which are chroma sample arrays may be used as inputs to the NNPF when they are present, where index idx may range from 0 to numInputPics−1.

$BitDepth_Y$ may represent the bit depth of the luma sample array of the input pictures.

$BitDepth_C$ may represent the bit depth of the chroma sample arrays (when present) of the input pictures.

ChromaFormatIdc may represent a chroma format identifier.

When the value of nnpfc_auxiliary_inp_idc is 1, the filtering strength control value StrengthControlVal shall be a real number in the range of 0 to 1.

The input picture having index 0 may correspond to a picture to which the NNPF defined by the NNPFC SEI message is activated by an NNPFA SEI message. The input picture with index i within the range from 1 to numInputPics−1 may precede the input picture with index i−1 in output order.

When nnpfc_purpose & 0x08 is not equal to 0 and the input picture with index 0 is associated with a frame packing arrangement SEI message having the same fp_arrangement_type as 5, all input pictures may be associated with a frame packing arrangement SEI message having the same fp_arrangement_type as 5 and may have the same value as fp_current_frame_is_frame0_flag.

More than or equal to two NNPFC SEI messages may exist for the same picture. When more than or equal to two NNPFC SEI messages with different nnpfc_id values are present or activated for the same picture, the NNPFC SEI messages may have either the same or different nnpfc_purpose and nnpfc_mode_idc values.

nnpfc_purpose may indicate the purpose of the NNPF as shown in Table 4. The value of nnpfc_purpose may be restricted to be present within the range of 0 to 63 in the bitstream. Values in the range of 64 to 65 535 for nnpfc_purpose may be reserved for future use. Decoders shall ignore an NNPFC SEI message with nnpfc_purpose in the range of 64 to 65 535. When the value of nnpfc_purpose is reserved for future use, the syntax element of the SEI message may be extended to syntax elements that are present under the condition of nnpfc_purpose being equal to the corresponding value. When ChromaFormatIdc is equal to 3, nnpfc_purpose & 0x02 shall be equal to 0. When either ChromaFormatIdc or nnpfc_purpose & 0x02 is not equal to 0, nnpfc_purpose & 0x20 shall be equal to 0.

TABLE 4

| Value | Interpretation |
|---|---|
| nnpfc_purpose = = 0 | May be used as determined by the application |
| nnpfc purpose > 0 && ( nnpfc purpose & 0x01 ) = = 0 | No general visual quality improvement |
| ( nnpfc purpose & 0x01 ) != 0 | With general visual quality improvement |
| nnpfc purpose > 0 && ( nnpfc purpose & 0x02 ) = = 0 | No chroma upsampling (from the 4:2:0 chroma format to the 4:2:2 or 4:4:4 chroma format, or from the 4:2:2 chroma format to the 4:4:4 chroma format) |
| ( nnpfc purpose & 0x02 ) != 0 | With chroma upsampling |
| nnpfc purpose > 0 && ( nnpfc purpose & 0x04 ) = = 0 | No resolution upsampling (increasing the width or height) |
| ( nnpfc purpose & 0x04 ) != 0 | With resolution upsampling |
| nnpfc purpose > 0 && ( nnpfc purpose & 0x08 ) = = 0 | No picture rate upsampling |

TABLE 4-continued

| Value | Interpretation |
|---|---|
| ( nnpfc purpose & 0x08 ) != 0 | With picture rate upsampling |
| nnpfc purpose > 0 && ( nnpfc purpose & 0x10 ) = = 0 | No bit depth upsampling (increasing the luma bit depth or the chroma bit depth) |
| ( nnpfc purpose & 0x10 ) != 0 | With bit depth upsampling |
| nnpfc purpose > 0 && ( nnpfc purpose & 0x20 ) = = 0 | No colourization (from the 4:0:0 chroma format to the 4:2:0, 4:2:2, or 4:4:4 chroma format) |
| ( nnpfc purpose & 0x20 ) != 0 | With colourization |

The nnpfc_id may include an identification number usable for identifying a NNPF. The nnpfc_id value shall exist in the range of 0 to $2^{32}-2$. The nnpfc_id value in the ranges of 256 to 511 and $2^{31}$ to $2^{32}-2$ may be reserved for future use. Decoders shall ignore an NNPFC SEI message with an nnpfc_id in the range of 256 to 511 or $2^{31}$ to $2^{32}-2$.

When an NNPFC SEI message is the first NNPFC SEI message in decoding order within the current CLVS having a specific nnpfc_id value, the following may apply.

The SEI message may represent a base NNPF.

The SEI message may be associated, in output order, with the currently decoded picture and all subsequently decoded pictures of the current layer until the current CLVS ends.

An NNPFC SEI message may be a repetition of a previous NNPFC SEI message within the current CLVS in decoding order, and the following semantics may be applied under the assumption that the SEI message is the only NNPFC SEI message having the same content within the current CLVS.

A value 0 of nnpfc_mode_idc may indicate that the SEI message includes a bitstream indicating a base NNPF or indicates an update related to a base NNPF with the same nnpfc_id value.

When the NNPFC SEI message is the first NNPFC SEI message in decoding order with a specific nnpfc_id value within the current CLVS, a value 1 of nnpfc_mode_idc may indicate that the base NNPF related to the nnpfc_id value is a neural-network, and the neural-network may be a neural-network identified by a URI indicated by nnpfc_uri using a format identified by the tag URI nnpfc_tag_uri.

When the NNPFC SEI message is not the first NNPFC SEI message in decoding order with a specific nnpfc_id value within the current CLVS and is not a repetition of the first NNPFC SEI message, a value 1 of nnpfc_mode_idc may indicate that the update related to the base NNPF with the same nnpfc_id value is defined by a URI indicated by nnpfc_uri using a format identified by the tag URI nnpfc_tag_uri.

The value of nnpfc_mode_idc may be restricted to a range of 0 to 1 in the bitstream. A value in the range of 2 to 255 for nnpfc_mode_idc may be reserved for future use and may not be present in the bitstream. Decoders shall ignore an NNPFC SEI message having an nnpfc_mode_idc value in the range of 2 to 255. Values greater than 255 for nnpfc_mode_idc may not be present in the bitstream and may not be reserved for future use.

When the SEI message is the first NNPFC SEI message in decoding order with a specific nnpfc_id value within the current CLVS, NNPF PostProcessingFilter( ) may be assigned to be the same as the base NNPF.

When the SEI message is not the first NNPFC SEI message in decoding order with a specific nnpfc_id value within the current CLVS and is not a repetition of the first NNPFC SEI message, NNPF PostProcessingFilter( ) may be obtained by applying the update defined by the SEI message to the base NNPF.

The updates are not cumulative, and rather, each update may be applied to the base NNPF which is an NNPF that is specified by the first NNPFC SEI message in decoding order having the specific nnpfc_id value within the current CLVS.

The nnpfc_reserved_zero_bit_a may be restricted to have a value equal to 0 due to a bitstream constraint. Decoders may be restricted to ignore NNPFC SEI messages in which the value of nnpfc_reserved_zero_bit_a is not 0.

The nnpfc_tag_uri may include a tag URI with syntax and semantics specified in IETF RFC 4151 identifying a neural-network used as a base NNPF or an update relative to the base NNPF using the nnpfc_id value specified by nnpfc_uri. By using nnpfc_tag_uri, the format of neural-network data specified by nnrpf_uri may be uniquely identified without a central registration authority. An nnpfc_tag_uri equal to "tag: iso.org,2023:15938-17" may indicate that the neural-network data identified by nnpfc_uri conforms to ISO/IEC 15938-17.

The nnpfc_uri may include an URI having syntax and semantics specified in IETF Internet Standard 66, which identifies a neural-network used as a base NNPF or an update relative to the base NNPF using the same nnpfc_id value.

A value 1 of nnpfc_property_present_flag may indicate the presence of a syntax element related to filter purpose, input formatting, output formatting, and complexity. A value 0 of nnpfc_property_present_flag may indicate the absence of a syntax element related to filter purpose, input formatting, output formatting, and complexity. When the SEI message is the first NNPFC SEI message in decoding order and has a specific nnpfc_id value within the current CLVS, the value of nnpfc_property_present_flag may be restricted to be equal to 1. When the value of nnpfc_property_present_flag is equal to 0, the values of all syntax elements that are present only when the value of nnpfc_property_present_flag is 1 and for which inference values are not specified may be inferred to be equal to the corresponding syntax elements in the NNPFC SEI message that includes the base NNPF to which the SEI provides an update.

A value 1 of nnpfc_base_flag may indicate that the SEI message indicates a base NNPF. A value 0 of nnpfc_base_flag may indicate that the SEI message indicates an update related to the base NNPF. When nnpfc_base_flag is not present, the value of nnpfc_base_flag may be inferred to be 0.

The following constraints may be applied to the value of nnpfc_base_flag.

When the NNPFC SEI message is the first NNPFC SEI message in decoding order with a specific nnpfc_id value within the current CLVS, the value of nnpfc_base_flag may be required to be equal to 1.

When the NNPFC SEI message nnpfcB is not the first NNPFC SEI message in decoding order with a specific nnpfc_id value within the current CLVS and the value of nnpfc_base_flag is equal to 1, the NNPFC SEI message may correspond to a repetition of the first NNPFC SEI message nnpfcA with the same nnpfc_id in decoding order. In other words, the payload content of nnpfcB may be required to be same as the payload content of nnpfcA.

When the NNPFC SEI message is not the first NNPFC SEI message in decoding order with a specific nnpfc_id value within the current CLVS and does not correspond to a repetition of the first NNPFC SEI message with the specific nnpfc_id value, the following may apply.

The SEI message may define an update related to a preceding base NNPF in decoding order with the same nnpfc_id value.

The SEI message is associated with the current reconstructed picture and all subsequent reconstructed pictures of the current layer in output order, until the end of the current CLVS or only up to a reconstructed picture that follows the current reconstructed picture within the current CLVS, and is associated with a subsequent NNPFC SEI message, in decoding order, having a earlier value among specific nnpfc_id values within the current CLVS.

When the NNPFC SEI message nnpfcCurr is not the first NNPFC SEI message in decoding order with a specific nnpfc_id value within the current CLVS, is not a repetition of the first NNPFC SEI message with the specific nnpfc_id value (i.e., when the value of nnpfc_base_flag is 0), and the value of nnpfc_property_present_flag is 1, the following constraints may apply.

The value of nnpfc_purpose in the NNPFC SEI message shall be the same as the value of nnpfc_purpose in the first NNPFC SEI message in decoding order with the specific nnpfc_id value within the current CLVS.

The values of syntax elements nnpfc_base_flag and preceding nnpfc_complexity_info_present_flag in the NNPFC SEI message shall be the same as the values of the corresponding syntax elements in the first NNPFC SEI message in decoding order with the specific nnpfc_id value within the current CLVS.

The nnpfc_complexity_info_present_flag in the first NNPFC SEI message, in decoding order, having the specific nnpfc_id value within the current CLVS shall be equal to 0 or all shall be equal to 1, and the following may apply.

(1) nnpfc_parameter_parameter_type_idc in nnpfcCurr shall be equal to nnpfc_parameter_parameter_type_idc in nnpfcBase.

(2) When nnpfc_log 2_parameter_bit_length_minus3 is present in nnpfcCurr, the nnpfc_log 2_parameter_bit_length_minus3 in nnpfcCurr shall be less than or equal to the nnpfc_log 2_parameter_bit_length_minus3 in nnpfcBase.

(3) When nnpfc_num_parameters_idc in nnpfcBase is equal to 0, the nnpfc_num_parameters_idc in nnpfcCurr shall be equal to 0.

(4) Otherwise (i.e., when nnpfc_num_parameters_idc in nnpfcBase is greater than 0), the nnpfc_num_parameters_idc in nnpfcCurr shall be greater than 0 or shall be less than or equal to nnpfc_num_parameters_idc in nnpfcBase.

(5) When nnpfc_num_kmac_operations_idc in nnpfcBase is equal to 0, the nnpfc_num_kmac_operations_idc in nnpfcCurr shall be equal to 0.

(6) Otherwise (i.e., when nnpfc_num_kmac_operations_idc in nnpfcBase is greater than 0), the nnpfc_num_kmac_operations_idc in nnpfcCurr shall be greater than 0 and be less than or equal to nnpfc_num_kmac_operations_idc in nnpfcBase.

(7) When nnpfc_total_kilobyte_size in nnpfcBase is equal to 0, the nnpfc_total_kilobyte_size in nnpfcCurr shall be equal to 0.

(8) Otherwise (i.e., when nnpfc_total_kilobyte_size in nnpfcBase is greater than 0), the nnpfc_total_kilobyte_size in nnpfcCurr shall be greater than 0 or shall be less than or equal to nnpfc_total_kilobyte_size in nnpfcBase.

nnpfc_out_sub_c_flag may indicate the values of the variables outSubWidthC and outSubHeightC when nnpfc_purpose & 0x02 is not equal to 0. A value 1 of nnpfc_out_sub_c_flag may indicate that the value of outSubWidthC is 1 and the value of outSubHeightC is 1. A value 0 of nnpfc_out_sub_c_flag may indicate that the value of outSubWidthC is 2 and the value of outSubHeightC is 1. When the value of ChromaFormatIdc is equal to 2 and nnpfc_out_sub_c_flag is present, the value of nnpfc_out_sub_c_flag shall be equal to 1.

nnpfc_out_colour_format_idc may indicate the color format of the NNPFC output and the values of corresponding variables outSubWidthC and outSubHeightC when nnpfc_purpose & 0x20 is not equal to 0. A value 1 of nnpfc_out_colour_format_idc may indicate that the color format of NNPFC output is 4:2:0 format and both outSubWidthC and outSubHeightC are equal to 2. A value 2 of nnpfc_out_colour_format_idc may indicate that the color format of NNPFC output is 4:2:2 format, outSubWidthC is equal to 2 and outSubHeightC is equal to 1. A value 3 of nnpfc_out_colour_format_idc may indicate that the color format of NNPFC output is 4:4:4 format and both outSubWidthC and outSubHeightC are equal to 1. The value of nnpfc_out_colour_format_idc may be restricted to not be equal to 0.

When both nnpfc_purpose & 0x02 and nnpfc_purpose & 0x20 are equal to 0, outSubWidthC and outSubHeightC may each be inferred to be equal to SubWidthC and SubHeightC, respectively.

nnpfc_pic_width_in_luma_samples and nnpfc_pic_height_in_luma_samples may indicate the width and height, respectively, of the luma sample array of a picture resulting from applying the NNPF identified by nnpfc_id to the cropped decoded output picture. When nnpfc_pic_width_in_luma_samples and nnpfc_pic_height_in_luma_samples are not present, each may be inferred to be equal to CroppedWidth and CroppedHeight, respectively. The value of nnpfc_pic_width_in_luma_samples shall be in the range from CroppedWidth to CroppedWidth*16-1. The value of nnpfc_pic_height_in_luma_samples shall be in the range from CroppedHeight to CroppedHeight*16-1.

nnpfc_num_input_pics_minus1+1 may indicate the number of decoded output pictures used as input to the NNPF. The value of nnpfc_num_input_pics_minus1 may be restricted to be present in the range of 0 to 63.

nnpfc_interpolated_pics[i] may indicate the number of interpolated pictures generated by the NNPF between the i-th picture and the (i+1)-th picture used as input to the NNPF. The value of nnpfc_interpolated_pics[i] may be restricted to the range of 0 to 63. The value of nnpfc_interpolated_pics[i] may be restricted to be greater than 0 for at least one i in the range of 0 to nnpfc_num_input_pics_minus1-1.

The value 1 of nnpfc_input_pic_output_flag[i] may indicate that the NNPF generates a corresponding output picture for the i-th input picture. The value 0 of nnpfc_input_pic_output_flag[i] may indicate that the NNPF does not generate a corresponding output picture for the i-th input picture.

The variable numInputPics, indicating the number of pictures used as input to the NNPF, and the variable numOutputPics, indicating the total number of pictures generated as a result of the NNPF, may be derived as shown in Table 5.

TABLE 5

```
numInputPics = nnpfc_num_input_pics_minus1 + 1
if( ( nnpfc_purpose & 0x08 ) != 0 ) {
  for( i = 0, numOutputPics = 0; i < numInputPics; i++ )
    if( nnpfc_input_pic_output_flag[ i ] )
      numOutputPics++
  for( i = 0; i <= numInputPics − 2; i++ )
    numOutputPics += nnpfc_interpolated_pics[ i ]
} else
  numOutputPics = 1
```

A value 1 of nnpfc_component_last_flag may indicate that the last dimension of the input tensor inputTensor for the NNPF and the output tensor outputTensor resulting from NNPF are used for the current channel. A value 0 of nnpfc_component_last_flag may indicate that the third dimension of the input tensor inputTensor for the NNPF and the output tensor outputTensor resulting from the NNPF are used for the current channel.

The first dimension of the input tensor and the output tensor may be used as a batch index used in some neural-network frameworks. Although the formula in the semantics of this SEI message uses a batch size corresponding to a batch index of 0, the batch size used as input for neural-network inference may be determined by the implementation of the post-processing.

For example, when the value of nnpfc_inp_order_idc is equal to 3 and the value of nnpfc_auxiliary_inp_idc is equal to 1, the input tensor may include 7 channels, including 4 luma matrices, 2 chroma matrices, and 1 auxiliary input matrix. In this case, the DeriveInputTensors( ) process may derive each of the 7 channels of the input tensor one by one, and when a specific channel among these channels is being processed, that channel may be referred to as the current channel during the process.

The nnpfc_inp_format_idc may indicate a method of converting the sample value of a cropped decoded output picture into an input value of the NNPF. When nnpfc_inp_format_idc is 0, the input value for the NNPF is a real number, and the InpY( ) and InpC( ) functions may be defined as in Equation 1.

$$InpY(x) = x \div ((1 \ll BitDepth_Y) - 1)$$
$$InpC(x) = x \div ((1 \ll BitDepth_C) - 1) \quad \text{[Equation 1]}$$

When the value of nnpfc_inp_format_idc is 1, the input values for the NNPF are unsigned integer numbers, and the InpY( ) and InpC( ) functions may be derived as shown in Table 6.

TABLE 6

```
shiftY = BitDepth_Y − inpTensorBitDepth_Y
if( inpTensorBitDepth_Y >= BitDepth_Y)
  InpY( x ) = x << ( inpTensorBitDepth_Y − BitDepth_Y )
else
  InpY( x ) = Clip3(0, ( 1 << inpTensorBitDepth_Y ) − 1, ( x + ( 1 << (
shiftY − 1 ) ) ) >> shiftY )
shiftC = BitDepth_C − inpTensorBitDepth_C
if( inpTensorBitDepth_C >= BitDepth_C )
  InpC( x ) = x << ( inpTensorBitDepth_C − BitDepth_C )
else
  InpC( x ) = Clip3(0, ( 1 << inpTensorBitDepth_C ) − 1, ( x + (1 << (
shiftC − 1 ) ) ) >> shiftC )
```

The variable $inpTensorBitDepth_Y$ may be derived from the syntax element nnpfc_inp_tensor_luma_bitdepth_minus8 described below. $inpTensorBitDepth_C$ may be derived from the syntax element nnpfc_inp_tensor_chroma_bitdepth_minus8 described below.

A value of nnpfc_inp_format_idc greater than 1 may be reserved for future use and may not be present in the bitstream. Decoders shall ignore an NNPFC SEI message containing reserved values of nnpfc_inp_format_idc.

The value of nnpfc_inp_tensor_luma_bitlength_minus8+8 may indicate the bit depth of luma sample values in the input integer tensor. The value of $inpTensorBitDepth_Y$ may be derived as shown in Equation 2.

$$inpTensorBitDepth_Y = nnpfc\_inp\_tensor\_luma\_bitdepth\_minus8 + 8 \quad \text{[Equation 2]}$$

The value of nnpfc_inp_tensor_luma_bitlength_minus8 may be restricted to be present in the range of 0 to 24.

nnpfc_inp_tensor_chroma_bitdepth_minus8+8 may indicate the bit depth of chroma sample values in the input integer tensor. The value of $inpTensorBitDepth_C$ may be derived as shown in Equation 3.

$$inpTensorBitDepth_C = nnpfc\_inp\_tensor\_chroma\_bitdepth\_minus8 + 8 \quad \text{[Equation 3]}$$

The value of nnpfc_inp_tensor_chroma_bitdepth_minus8 may be restricted to be present in the range of 0 to 24.

nnpfc_inp_order_idc may indicate a method of arranging the sample array of the cropped decoded output picture as one of the input pictures for the NNPF.

The value of nnpfc_inp_order_idc shall be present in the range of 0 to 3 in the bitstream. A value from 4 to 255 for nnpfc_inp_order_idc is not present in the bitstream. Decoders shall ignore an NNPFC SEI message having an nnpfc_inp_order_idc in the range of 4 to 255. A value of nnpfc_inp_order_idc greater than 255 is not present in the bitstream and is not reserved for future use.

When the value of ChromaFormatIdc is not 1, the value of nnpfc_inp_order_idc shall not be 3.

Table 7 includes a description of the value of nnpfc_inp_order_idc.

TABLE 7

| nnpfc_inp_order_idc | Description |
|---|---|
| 0 | When the value of nnpfc_auxiliary_inp_idc is 0, one luma matrix may be present in the input tensor for each input picture, and the number of channels may be 1. Otherwise, when the value of nnpfc_auxiliary_inp_idc is 1, one luma matrix and one auxiliary input matrix may be present, and the number of channels may be 2. |
| 1 | When the value of nnpfc_auxiliary_inp_idc is 0, two chroma matrices may be present in the input tensor, and the number of channels may be 2. Otherwise, when the value of nnpfc_auxiliary_inp_idc is 1, two chroma matrices and one auxiliary input matrix may be present, and the number of channels may be 3. |
| 2 | When the value of nnpfc_auxiliary_inp_idc is 0, one luma matrix and two chroma matrices may be present in the input tensor, and the number of channels may be 3. Otherwise, when the value of nnpfc_auxiliary_inp_idc is 1, one luma matrix, two chroma matrices, and one auxiliary input matrix may be present, and the number of channels may be 4. |
| 3 | When the value of nnpfc_auxiliary_inp_idc is 0, four luma matrices and two chroma matrices may be present in the input tensor, and the number of channels may be 6. Otherwise, when the value of nnpfc_auxiliary_inp_idc is 1, four luma matrices, two chroma matrices, and one |

TABLE 7-continued

Figure 4:
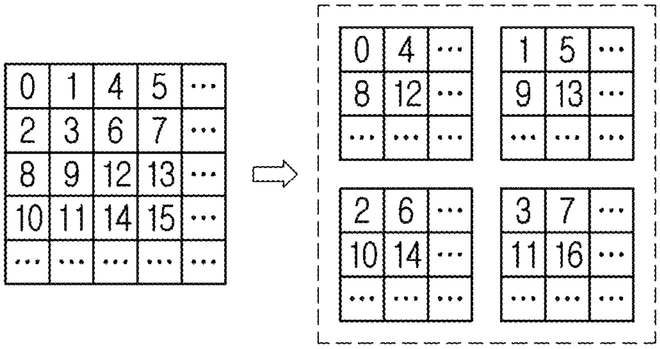
FIG. 4 is a diagram for illustrating an interleaved scheme for deriving a luma channel.

| nnpfc_inp_ order_idc | Description |
|---|---|
| | auxiliary input matrix may be present, and the number of channels may be 7. The luma channel may be derived using an interleaved scheme as shown in FIG. 4. The nnpfc_inp_order_idc may be used only when the input chroma format is 4:2:0. |
| 4 . . . 255 | Reserved |

A patch may be a rectangular array of samples from a component of a picture (e.g., luma or chroma component).

The nnpfc_auxiliary_inp_idc greater than 0 may indicate that auxiliary input data is present in the input tensor of the NNPF. The value 0 of nnpfc_auxiliary_inp_idc may indicate that auxiliary input data is not present in the input tensor. The value 1 of nnpfc_auxiliary_inp_idc may indicate that the auxiliary input data is derived using the method described in Tables 8 to 10.

The value of nnpfc_auxiliary_inp_idc shall exist in the range of 0 to 1 in the bitstream. A value from 2 to 255 for nnpfc_inp_order_idc is not present in the bitstream. Decoders shall ignore an NNPFC SEI message with an nnpfc_inp_order_idc in the range of 2 to 255. A value greater than 255 for nnpfc_inp_order_idc is not present in the bitstream and is not reserved for future use.

When the value of nnpfc_auxiliary_inp_idc is equal to 1, the variable strengthControlScaledVal may be derived as shown in Equation 4.

$$\text{if (nnpfc\_inp\_format\_idc == 1)}\ streghtControlScaledVal = Floor\ (StregthControlVal * ((1 \ll inpTensorBitDepth_Y) - 1)) \quad \text{else}\ streghtControlScaledVal = StrengthControlVal \qquad \text{[Equation 4]}$$

A process DeriveInputTensors( ) for deriving the input tensor inputTensor for a given vertical sample coordinate cTop and a horizontal sample coordinate cLeft specifying the top-left sample position of a sample patch included in the input tensor may be described as the combination of Tables 8 to 10.

TABLE 8

```
for( i = 0; i < numInputPics; i++ ) |
  if( nnpfc_inp_order_idc = = 0 )
    for( yP = −nnpfc_overlap; yP < inpPatchHeight + nnpfc_overlap; yP++)
      for( xP = −nnpfc_overlap; xP < inpPatchWidth + nnpfc_overlap; xP++ ) {
        inpVal = InpY( InpSampleVal( cTop + yP, cLeft + xP, CroppedHeight,
            CroppedWidth, CroppedYPic[ i ] ) )
        yPovlp = yP + nnpfc_overlap
        xPovlp = xP + nnpfc_overlap
        if( !nnpfc_component_last_flag )
          inputTensor[ 0 ][ i ][ 0 ][ yPovlp ][ xPovlp ] = inpVal
        else
          inputTensor[ 0 ][ i ][ yPovlp ][ xPovlp ][ 0 ] = inpVal
        if( nnpfc_auxiliary_inp_idc = = 1 )
          if( !nnpfc_component_last_flag )
            inputTensor[ 0 ][ i ][ 1 ][ yPovlp ] xPovlp ] = strengthControlScaledVal
          else
            inputTensor[ 0 ][ i ][ yPovlp ][ xPovlp ][ 1 ] = strengthControlScaledVal
      }
  else if( nnpfc_inp_order_idc = = 1 )
    for( yP = −nnpfc_overlap; yP < inpPatchHeight + nnpfc_overlap; yP++)
      for( xP = −nnpfc_overlap; xP < inpPatchWidth + nnpfc_overlap; xP++ ) {
        inpCbVal = InpC( InpSampleVal( cTop + yP, cLeft + xP, CroppedHeight / SubHeightC,
            CroppedWidth / SubWidthC, CroppedCbPic[ i ] ) )
        inpCrVal = InpC( InpSampleVal( cTop + yP, cLeft + xP, CroppedHeight / SubHeightC,
            CroppedWidth / SubWidthC, CroppedCrPic[ i ] ) )
        yPovlp = yP + nnpfc_overlap
        xPovlp = xP + nnpfc_overlap
        if( !nnpfc_component_last_flag ) {
          inputTensor[ 0 ][ i ][ 0 ][ yPovlp ][ xPovlp ] = inpCbVal
          inputTensor[ 0 ][ i ][ 1 ][ yPovlp ][ xPovlp ] = inpCrVal
        } else {
          inputTensor[ 0 ][ i ][ yPovlp ][ xPovlp ][ 0 ] = inpCbVal
          inputTensor[ 0 ][ i ][ yPovlp ][ xPovlp ][ 1 ] = inpCrVal
        }
        if( nnpfc_auxiliary_inp_idc = = 1 )
          if( !nnpfc_component_last_flag )
            input Tensor[ 0 ][ i ][ 2 ][ yPovlp ][ xPovlp ] = strengthControlScaledVal
          else
            inputTensor[ 0 ][ i ][ yPovlp ][ xPovlp ][ 2 ] = strengthControlScaledVal
      }
```

TABLE 9

```
else if( nnpfc_inp_order_idc = = 2 )
  for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
      yY = cTop + yP
      xY = cLeft + xP
      yC = yY / SubHeightC
      xC = xY / SubWidthC
```

TABLE 9-continued

```
        inpYVal = InpY( InpSampleVal( yY, xY, CroppedHeight,
            CroppedWidth, CroppedYPic[ i ] ) )
        inpCbVal = InpC( InpSampleVal( yC, xC, CroppedHeight / SubHeightC,
            CroppedWidth / SubWidthC, CroppedCbPic[ i ] ) )
        inpCrVal = InpC( InpSampleVal( yC, xC, CroppedHeight / SubHeightC,
            CroppedWidth / SubWidthC, CroppedCrPic[ i ] ) )
        yPovlp = yP + nnpfc_overlap
        xPovlp = xP + nnpfc_overlap
        if( !nnpfc_component_last_flag ) {
          inputTensor[ 0 ][ i ][ 0 ][ yPovlp ][ xPovlp ] = inpYVal
          inputTensor[ 0 ][ i ][ 1 ][ yPovlp ][ xPovlp ] = inpCbVal
          inputTensor[ 0 ][ i ][ 2 ][ yPovlp ][ xPovlp ] = inpCtVal
        } else {
          inputTensor[ 0 ][ i ][ yPovlp ][ xPovlp ][ 0 ] = inpYVal
          inputTensor[ 0 ][ i ][ yPovlp ][ xPovlp ][ 1 ] = inpCbVal
          inputTensor[ 0 ][ i ][ yPovlp ][ xPovlp ][ 2 ] = inpCrVal
        }
        if( nnpfc_auxiliary_inp_idc = = 1 )
          if( !nnpfc_component_last_flag )
            inputTensor[ 0 ][ i ][ 3 ][ yPovlp ][ xPovlp ] = strengthControlScaledVal
          else
            inputTensor[ 0 ][ i ][ yPovlp ][ xPovlp ][ 3 ] = strengthControlScaledVal
      }
else if( nnpfc_inp_order_idc = = 3 )
  for( yP = -nnpfc_overlap; yP < inpPatchHeight + nnpfc_overlap; yP++)
    for( xP = -nnpfc_overlap; xP < inpPatchWidth + nnpfc_overlap; xP++ ) {
        yTL = cTop + yP * 2
        xTL = cLeft + xP * 2
        yBR = yTL + 1
        xBR = xTL + 1
        yC = cTop / 2 + yP
        xC = cLeft / 2 + xP
        inpTLVal = InpY( InpSampleVal( yTL, xTL, CroppedHeight,
          CroppedWidth, CroppedYPic[ i ] ) )
        inpTRVal = InpY( InpSampleVal( yTL, xBR, CroppedHeight,
          CroppedWidth, CroppedYPic[ i ] ) )
        inpBLVal = InpY( InpSampleVal( yBR, xTL, CroppedHeight,
          CroppedWidth, CroppedYPic[ i ] ) )
```

TABLE 10

```
      inpBRVal = InpY( InpSampleVal( yBR, xBR, CroppedHeight,
          CroppedWidth, CroppedYPic[ i ] ) )
      inpCbVal = InpC( InpSampleVal( yC, xC, CroppedHeight / 2,
          CroppedWidth / 2, CroppedCbPic[ i ] ) )
      inpCrVal = InpC( InpSampleVal( yC, xC, CroppedHeight / 2,
          CroppedWidth / 2, CroppedCrPic[ i ] ) )
      yPovlp = yP + nnpfc_overlap
      xPovlp = xP + nnpfc_overlap
      if( !nnpfc_component_last_flag ) {
        inputTensor[ 0 ][ i ][ 0 ][ yPovlp ][ xPovlp ] = inpTLVal
        inputTensor[ 0 ][ i ][ 1 ][ yPovlp ][ xPovlp ] = inpTRVal
        inputTensor[ 0 ][ i ][ 2 ][ yPovlp ][ xPovlp ] = inpBLVal
        inputTensor[ 0 ][ i ][ 3 ][ yPovlp ][ xPovlp ] = inpBRVal
        inputTensor[ 0 ][ i ][ 4 ][ yPovlp ][ xPovlp ] = inpCbVal
        inputTensor[ 0 ][ i ][ 5 ][ yPovlp ][ xPovlp ] = inpCrVal
      } else {
        inputTensor[ 0 ][ i ][ yPovlp ][ xPovlp ][ 0 ] = inpTLVal
        inputTensor[ 0 ][ i ][ yPovlp ][ xPovlp ][ 1 ] = inpTRVal
        inputTensor[ 0 ][ i ][ yPovlp ][ xPovlp ][ 2 ] = inpBLVal
        inputTensor[ 0 ][ i ][ yPovlp ][ xPovlp ][ 3 ] = inpBRVal
        inputTensor[ 0 ][ i ][ yPovlp ][ xPovlp ][ 4 ] = inpCbVal
        inputTensor[ 0 ][ i ][ yPovlp ][ xPovlp ][ 5 ] = inpCrVal
      }
      if( nnpfc_auxiliary_inp_idc = = 1 )
        if( !nnpfc_component_last_flag )
          inputTensor[ 0 ][ i ][ 6 ][ yPovlp ][ xPovlp ] =
          strengthControlScaledVal
        else
          inputTensor[ 0 ][ i ][ yPovlp ][ xPovlp ][ 6 ] =
          strengthControlScaledVal
    }
}
```

A value 1 of nnpfc_separate_colour_description_present_flag may indicate that a unique combination of colour primaries, transform characteristics, and matrix coefficients for the picture resulting from the NNPF is specified in the SEI message syntax structure. A value 0 of nnfpc_separate_colour_description_present_flag may indicate that the combination of colour primaries, transform characteristics, and matrix coefficients for the picture resulting from the NNPF is the same as those indicated by the VUI parameters of the CLVS.

The nnpfc_colour_primaries may have the same semantics as the vui_colour_primaries syntax element, except for the following.

- nnpfc_colour_primaries may indicate the colour primaries of the picture resulting from applying the NNPF specified in the SEI message, rather than the colour primaries used for the CLVS.
- When nnpfc_colour_primaries is not present in the NNPFC SEI message, the value of nnpfc_colour_primaries may be inferred to be equal to the value of vui_colour_primaries.

The nnpfc_transfer_characteristics may have the same semantics as the vui_transfer_characteristics syntax element, except for the following.

- nnpfc_transfer_characteristics may indicate the transfer characteristic of the picture resulting from applying the NNPF specified in the SEI message, rather than the transfer characteristic used for the CLVS.
- When nnpfc_transfer_characteristics is not present in the NNPFC SEI message, the value of nnpfc_transfer_characteristics may be inferred to be equal to the value of vui_transfer_characteristics.

The nnpfc_matrix_coeffs may have the same semantics as the vui_matrix_coeffs syntax element, except for the following:

nnpfc_matrix_coeffs may indicate the matrix coefficient of the picture resulting from applying the NNPF specified in the SEI message, rather than the matrix coefficient used for the CLVS.

When nnpfc_matrix_coeffs is not present in the NNPFC SEI message, the value of nnpfc_matrix_coeffs may be inferred to be equal to the value of vui_matrix_coeffs.

The allowable value for nnpfc_matrix_coeffs may not be limited by the chroma format of the decoded video pictures indicated by the value of ChromaFormatIdc in the semantics of the VUI parameters.

When the value of nnpfc_matrix_coeffs is equal to 0, the value of nnpfc_out_order_idc shall not be equal to 1 or 3.

A value 0 of nnpfc_out_format_idc may indicate that for bit depth bitDepth required for subsequent post-processing or display, the sample value output by the NNPF is a real number whose value range from 0 to 1 is linearly mapped to an unsigned integer value range from 0 to (1<<bitDepth)−1. The value 1 of nnpfc_out_format_idc may indicate that a luma sample value output by the NNPF is an unsigned integer in the range of 0 to (1<<(nnpfc_out_tensor_luma_bitlength_minus8+8))−1, and that a chroma sample value output by the NNPF is an unsigned integer in the range of 0 to (1<<(nnpfc_out_tensor_chroma_bitlength_minus8+8))−1.

A value of nnpfc_out_format_idc greater than 1 may be reserved for future use and shall not be present in the bitstream. Decoders shall ignore an NNPFC SEI message containing a reserved value of nnpfc_out_format_idc.

nnpfc_out_tensor_luma_bitdepth_minus8+8 may indicate the bit depth of a luma sample value in the output integer tensor. The value of nnpfc_out_tensor_luma_bitdepth_minus8 shall be present in the range of 0 to 24.

nnpfc_out_tensor_chroma_bitdepth_minus8+8 may indicate the bit depth of a chroma sample value in the output integer tensor. The value of nnpfc_out_tensor_chroma_bitdepth_minus8 shall be present in the range of 0 to 24.

When nnpfc_purpose & 0x10 is not equal to 0, the value of nnpfc_out_format_idc shall be equal to 1, and at least one of the following restrictions may be true.

nnpfc_out_tensor_luma_bitdepth_minus8+8 is greater than $BitDepth_Y$ nnpfc_out_tensor_chroma_bitdepth_minus8+8 is greater than $BitDepth_C$ nnpfc_out_order_idc may indicate the output order of samples output from the NNPF. The value of nnpfc_out_order_idc shall be present in the range of 0 to 3 in the bitstream. Values from 4 to 255 for nnpfc_out_order_idc is not present in the bitstream. Decoders shall ignore an NNPFC SEI message with nnpfc_out_order_idc in the range of 4 to 255. A value greater than 255 for nnpfc_out_order_idc is not present in the bitstream and is not reserved for future use. When nnpfc_purpose & 0x02 is equal to 0, the value of nnpfc_out_order_idc shall not be equal to 3.

Table 11 describes the value of nnpfc_out_order_idc.

TABLE 11

| nnpfc__out__order__idc | Description |
|---|---|
| 0 | Since only a luma matrix is present in the output tensor, the number of channels may be equal to 1. |
| 1 | Since only chroma matrices are present in the output tensor, the number of channels may be equal to 2. |
| 2 | Since both luma and chroma matrices are present in the output tensor, the number of channels may be equal to 3. |
| 3 | Since four luma matrices and two chroma matrices exist in the output tensor, the number of channels may be equal to 6. The nnpfc__out__order__idc may be used only when the output chroma format is 4:2:0. |
| 4 . . . 255 | Reserved |

A process StoreOutputTensors( ) for deriving sample values in FilteredYPic, FilteredCbPic, and FilteredCrPic, which are filtered output sample arrays from the output tensor outputTensor, for a given vertical sample coordinate cTop and a horizontal sample coordinate cLeft indicating the top-left sample position of a patch of samples included in the input tensor, may be represented as the combination of Table 12 and Table 13.

TABLE 12

```
for( i = 0; i < numOutputPics; i++ ) {
  if( nnpfc__out__order__idc = = 0 )
    for( yP = 0; yP < outPatchHeight; yP++)
      for( xP = 0; xP < outPatchWidth; xP++ ) {
        yY = cTop * outPatchHeight / inpPatchHeight + yP
        xY = cLeft * outPatchWidth / inpPatchWidth + xP
        if ( yY < nnpfc__pic__height__in__luma__samples && xY < nnpfc__pic__width__in__luma__samples )
          if( !nnpfc__component__last__flag )
            FilteredYPic[ i ][ xY ][ yY ] = outputTensor[ 0 ][ i ][ 0 ][ yP ][ xP ]
          else
            FilteredYPic[ i ][ xY ][ yY ] = outputTensor[ 0 ][ i ][ yP ][ xP ][ 0 ]
  else if( nnpfc__out__order__idc = = 1 )
    for( yP = 0; yP < outPatchCHeight; yP++)
      for( xP = 0; xP < outPatchCWidth; xP++ ) {
        xSrc = cLeft * horCScaling + xP
        ySrc =cTop * verCScaling + yP
        if ( ySrc < nnpfc__pic__height__in__luma__samples / outSubHeightC &&
            xSrc < nnpfc__pic__width__in__luma__samples / outSubWidthC )
          if( !nnpfc__component__last__flag ) {
            FilteredCbPic[ i ][ xSrc ][ ySrc ] = outputTensor[ 0 ][ i ][ 0 ][ yP ][ xP ]
            FilteredCrPic[ i ][ xSrc ]{ ySrc ] = outputTensor[ 0 ][ i ][ 1 ][ yP ][ xP ]
          } else {
            FilteredCbPic[ i ][ xSrc ][ ySrc ] = outputTensor[ 0 ][ i ][ yP ][ xP [[ 0 ]
            FilteredCrPic[ i ][ xSrc ][ ySrc ] = outputTensor[ 0 ][ i ][ yP ][ xP ][ 1 ]
          }
```

TABLE 12-continued

```
        }
    else if( nnpfc__out__order__idc = = 2 )
        for( yP = 0; yP < outPatchHeight; yP++)
            for( xP = 0; xP < outPatchWidth; xP++ ) {
                yY = cTop * outPatchHeight / inpPatchHeight + yP
                xY = cLeft * outPatchWidth / inpPatchWidth + xP
                yC = yY / outSubHeightC
                xC = xY / outSubWidthC
                yPc = ( yP / outSubHeightC ) * outSubHeightC
                xPc = ( xP / outSubWidthC ) * outSubWidthC
                if ( yY & nnpfc__pic__height__in__luma__samples && xY < nnpfc__pic__width__in__luma__samples)
                    if( !nnpfc__component__last__flag ) {
                        FilteredYPic[ i ][ xY ][ yY ] = outputTensor[ 0 ][ i ][ 0 ][ yP ][ xP ]
                        FilteredCbPic[ i ][ xC ] yC ] = outputTensor[ 0 ][ i ][ 1 ][ yPc ][ xPc ]
                        FilteredCrPic[ i ][ xC ][ yC ] = outputTensor[ 0 ][ i ][ 2 ][ yPc ][ xPc ]
                    } else {
                        FilteredYPic[ i ][ xY ][ yY ] = outputTensor[ 0 ][ i ][ yP ][ xP ][ 0 ]
                        FilteredCbPic[ i ][ xC ][ yC ] = outputTensor[ 0 ][ i ][ yPc ][ xPc ][ 1 ]
                        FilteredCrPic[ i ][ xC ][ yC ] = outputTensor[ 0 ][ i ][ yPc ][ xPc ][ 2 ]
                    }
            }
```

TABLE 13

```
    else if( nnpfc__out__order__id = = 3 )
        for( yP = 0; yP < outPatchHeight; yP++ )
            for( xP = 0; xP < outPatchWidth; xP++ ) {
                ySrc = cTop / 2 * outPatchHeight / inpPatchHeight + yP
                xSrc = cLeft / 2 * outPatchWidth / inpPatchWidth + xP
                if ( ySrc < nnpfc__pic__height__in__luma__samples / 2 &&
                        xSrc < nnpfc__pic__width__in__luma__samples / 2 )
                    if( !nnpfc__component__last__flag ) {
                        FilteredYPic[ i ][ xSrc * 2 ][ ySrc * 2 ] = outputTensor[ 0 ][ i ][ 0 ][ yP ][ xP ]
                        FilteredYPic[ i ][ xSrc * 2 + 1 ][ ySrc * 2 ] = outputTensor[ 0 ][ i ][ 1 ][ yP ][ xP ]
                        FilteredYPic[ i ][ xSrc * 2 ][ ySrc * 2 + 1 ] = outputTensor[ 0 ][ i ][ 2 ][ yP ][ xP ]
                        FilteredYPic[ i ][ xSrc * 2 + 1][ ySrc * 2 + 1 ] = outputTensor[ 0 ][ 1 ][ 3 ][ yP ][ xP ]
                        FilteredCbPic[ i ][ xSrc ][ ySrc ] = outputTensor[ 0 ][ i ][ 4 ][ yP ][ xP ]
                        FilteredCrPic[ i ][ xSrc ][ ySrc ] = outputTensor[ 0 ][ i ][ 5 ][ yP ][ xP ]
                    } else {
                        FilteredYPic[ i ][ xSrc * 2 ][ ySrc * 2 ] = outputTensor[ 0 ][ i ][ yP ][ xP [ 0 ]
                        FilteredYPic[ i ][ xSrc * 2 + 1 ][ ySrc * 2 ] = outputTensor[ 0 ][ i ][ yP ][ xP ][ 1 ]
                        FilteredYPic[ i ][ xSrc * 2 ][ ySrc * 2 + 1 ] = outputTensor[ 0 ][ i ][ yP ][ xP ][ 2 ]
                        FilteredYPic[ i ][ xSrc * 2 + ][ ySrc * 2 + 1 ] = outputTensor[ 0 ][ i ][ yP ][ xP ][ 3 ]
                        FilteredCbPic[ i ][ xSrc ][ ySrc ] = outputTensor[ 0 ][ i ][ yP ][ xP ][ 4 ]
                        FilteredCrPic[ i ][ xSrc ][ ySrc ] = outputTensor[ 0 ][ i ][ yP ][ xP ][ 5 ]
                    }
            }
}
```

nnpfc_overlap may indicate the number of horizontal and vertical samples of overlapping of a neighboring input tensor of the NNPF. The value of nnpfc_overlap shall be present in the range of 0 to 16 383.

The value 1 of nnpfc_constant_patch_size_flag may indicate that the NNPF exactly accepts a patch size indicated by nnpfc_patch_width_minus1 and nnpfc_patch_height_minus1 as an input. The value 0 of nnpfc_constant_patch_size_flag may indicate that the NNPF accepts an arbitrary patch size having width inpPatchWidth and height inpPatchHeight as input. Here, the width of an extended patch, which is equal to inpPatchWidth+2*nnpfc_overlap (i.e., the patch plus the overlapping area), shall be a positive integer multiple of nnpfc_extended_patch_width_cd_delta_minus1+1+2*nnpfc_overlap, and the height of the extended patch, which is equal to inpPatchHeight+2*nnpfc_overlap, shall be a positive integer multiple of nnpfc_extended_patch_height_cd_delta_minus1+1+2*nnpfc_overlap.

npfc_patch_width_minus1+1 may indicate the number of horizontal samples in the patch size required as input to the NNPF when the value of nnpfc_constant_patch_size_flag is 1. The value of nnpfc_patch_width_minus1 shall be present in the range of 0 to Min (32 766, CroppedWidth−1).

npfc_patch_height_minus1+1 may indicate the number of vertical samples in the patch size required as input to the NNPF when the value of nnpfc_constant_patch_size_flag is 1. The value of nnpfc_patch_height_minus1 shall be present in the range of 0 to Min (32 766, CroppedHeight−1).

nnpfc_extended_patch_width_cd_delta_minus1+1+2*nnpfc_overlap may indicate a common divisor of allowed values of the width of an extended patch required as input to the NNPF when the value of nnpfc_constant_patch_size_flag is 0. The value of nnpfc_extended_patch_width_cd_delta_minus1 shall be present in the range of 0 to Min (32 766, CroppedWidth−1).

nnpfc_extended_patch_height_cd_delta_minus1+1+2*nnpfc_overlap may indicate a common divisor of allowed values of the height of an extended patch required as input to the NNPF when the value of nnpfc_constant_patch_size_flag is 0. The value of nnpfc_extended_patch_height_cd_delta_minus1 shall be present in the range of 0 to Min (32 766, CroppedHeight−1).

The variables inpPatchWidth and inpPatchHeight may be set to the width and height of the patch size, respectively.

When the value of nnpfc_constant_patch_size_flag is 0, the following may apply.

The values of inpPatchWidth and inpPatchHeight may be provided by an external means or set by the post-processor itself.

The value of inpPatchWidth+2*nnpfc_overlap shall be a positive integer multiple of nnpfc_extended_patch_width_cd_delta_minus1+1+2*nnpfc_overlap, and inpPatchWidth shall be less than or equal to CroppedWidth. The value of inpPatchHeight+2*nnpfc_overlap shall be a positive integer multiple of nnpfc_extended_patch_height_cd_delta_minus1+1+2*nnpfc_overlap, and inpPatchHeight shall be less than or equal to CroppedHeight.

Otherwise (i.e., when the value of nnpfc_constant_patch_size_flag is 1), the value of inpPatchWidth may be set to be equal to nnpfc_patch_width_minus1+1, and the value of inpPatchHeight may be set to be equal to nnpfc_patch_height_minus1+1.

The variables outPatchWidth, outPatchHeight, horCScaling, verCScaling, outPatchCWidth, and outPatchCHeight may be derived as shown in Table 14.

TABLE 14

```
outPatchWidth = ( nnpfc_pic_width_in_luma_samples *
inpPatchWidth ) / CroppedWidth (86)
outPatchHeight = ( nnpfc_pic_height_in_luma_samples *
inpPatchHeight ) / CroppedHeight (87)
horCScaling = SubWidthC / outSubWidthC
verCScaling = SubHeightC / outSubHeightC
outPatchCWidth = outPatchWidth * horCScaling
outPatchCHeight = outPatchHeight * verCScaling
```

It may be a bitstream conformance requirement that outPatchWidth*CroppedWidth shall be equal to nnpfc_pic_width_in_luma_samples*inpPatchWidth, and outPatchHeight*CroppedHeight shall be equal to nnpfc_pic_height_in_luma_samples*inpPatchHeight.

The nnpfc_padding_type may indicate a padding process when referring to a sample position outside the boundary of the cropped decoded output picture, as described in Table 15. The value of nnpfc_padding_type shall be present in the range of 0 to 15.

TABLE 15

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | reserved |

The nnpfc_luma_padding_val may indicate a luma value to be used for padding when the value of nnpfc_padding_type is 4.

The nnpfc_cb_padding_val may indicate a Cb value to be used for padding when the value of nnpfc_padding_type is 4.

The nnpfc_cr_padding_val may indicate a Cr value to be used for padding when the value of nnpfc_padding_type is 4.

A function InpSampleVal(y, x, picHeight, picWidth, CroppedPic), where the input includes vertical sample position y, horizontal sample position x, picture height picHeight, picture width picWidth, and a sample array CroppedPic, may return the value of Sample Val derived as shown in Table 16.

For the input to the InpSampleVal( ) function, the vertical position may be listed before the horizontal position to ensure compatibility with an input tensor convention of some inference engines.

TABLE 16

```
if( nnpfc_padding_type = = 0 )
  if( y < 0 | | x < 0 | | y >= picHeight | | >= picWidth )
    sampleVal = 0
  else
    sampleVal = croppedPic[ x ][ y ]
else if( nnpfc_padding_type = = 1 )
  sampleVal = croppedPic[ Clip3( 0, picWidth − 1, x ) ][ Clip3( 0,
  picHeight − 1, y ) ]
else if( nnpfc_padding_type = = 2 )
  sampleVal = croppedPic[ Reflect( picWidth − 1, x ) ][ Reflect(
  picHeight − 1, y ) ]
else if( nnpfc_padding_type = = 3 )
  if( y >= 0 && y < picHeight )
    sampleVal = croppedPic[ Wrap( picWidth − 1, x ) ][ y ]
else if( nnpfc_padding_type = = 4 )
  if( y < 0 | | x < 0 | | y >= picHeight | | x >= picWidth )
    sampleVal[ 0 ] = nnpfc_luma_padding_val
    sampleVal[ 1 ] = nnpfc_cb_padding_val
    sampleVal[ 2 ] = nnpfc_cr_padding_val
  else
    sampleVal = croppedPic[ x ][ y ]
```

The process of Table 17 may be used to generate a filtered and/or interpolated picture by filtering in a patch-based manner using NNPF PostProcessingFilter( ) and the filtered and/or interpolated picture may include a Y sample array FilteredYPic, a Cb sample array FilteredCbPic, and a Cr sample array FilteredCrPic, as indicated by nnpfc_out_order_idc.

TABLE 17

```
if( nnpfc_inp_order_idc = = 0 | | nnpfc_inp_order_idc = = 2 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1)
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
```

TABLE 17-continued

```
      DeriveInputTensors( )
      outputTensor = PostProcessingFilter( inputTensor )
      StoreOutputTensors( )
    }
else if( nnpfc_inp_order_idc = = 3 )
  for( cTop = 0; cTop < CroppedHeight: cTop += inpPatchHeight * 2 )
    for( cLeft = 0; cLeft < CroppedWidth, cLeft += inpPatchWidth * 2 ) {
      DeriveInputTensors( )
      outputTensor = PostProcessingFilter( inputTensor )
      StoreOutputTensors( )
    }
```

The order of pictures in the stored output tensor may be the output order, and the output order generated by applying the NNPF to the output order may be interpreted as an output order that does not conflict with the output order of the input picture.

A value 1 of nnpfc_complexity_info_present_flag may indicate that one or more syntax elements indicating the complexity of the NNPF associated with nnpfc_id are present. A value 0 of nnpfc_complexity_info_present_flag may indicate that syntax element indicating the complexity of the NNPF associated with nnpfc_id is not present.

A value 0 of nnpfc_parameter_type_idc may indicate that the neural-network uses only integer parameters. A value 1 of nnpfc_parameter_type_flag may indicate that the neural-network may use either floating-point or integer parameters. A value 2 of nnpfc_parameter_type_idc may indicate that the neural-network uses only binary parameters. A value 3 of nnpfc_parameter_type_idc may be reserved for future use and shall not be present in the bitstream. A decoder shall ignore an NNPFC SEI message with nnpfc_parameter_type_idc value equal to 3.

Values 0, 1, 2, and 3 of nnpfc_log 2_parameter_bit_length_minus3 may indicate that the neural-network does not use parameters with bit lengths greater than 8, 16, 32, and 64, respectively. When nnpfc_parameter_type_idc is present and nnpfc_log 2_parameter_bit_length_minus3 is not present, the neural-network may not use parameters with a bit length greater than 1.

The nnpfc_num_parameters_idc may indicate the maximum number of neural-network parameters for the NNPF in powers of 2 048. A value 0 of nnpfc_num_parameters_idc may indicate that the maximum number of neural-network parameters is unknown. The value of nnpfc_num_parameters_idc shall be present in the range of 0 to 52. A value greater than 52 for nnpfc_num_parameters_idc is not present in the bitstream. Decoders shall ignore an NNPFC SEI message having nnpfc_num_parameters_idc value greater than 52.

When the value of nnpfc_num_parameters_idc is greater than 0, a variable maxNumParameters may be derived as shown in Equation 5.

$$maxNumParameters = (2048 \ll nnpfc\_num\_paramaters\_idc) - 1 \quad \text{[Equation 5]}$$

The number of neural-network parameters for the NNPF may be constrained to be less than or equal to maxNumParameters.

nnpfc_num_kmac_operations_idc greater than 0 may indicate that the maximum number of multiply-accumulate operations per sample for the NNPF is less than or equal to nnpfc_num_kmac_operations_idc*1 000. A value 0 of nnpfc_num_kmac_operations_idc may indicate that the maximum number of multiply-accumulate operations for the network is unknown. The value of nnpfc_num_kmac_operations_idc shall be present in the range of 0 to $2^{32}-2$.

nnpfc_total_kilobyte_size greater than 0 may indicate the total size (in kilobytes) required to store the uncompressed parameters of the neural-network. The total size in bits may be greater than or equal to the sum of the number of bits used to store each parameter. The nnpfc_total_kilobyte_size may be the result of dividing the total size (in bits) by 8 000 and rounding. A value 0 of nnpfc_total_kilobyte_size may indicate that the total size required to store the parameters for the neural-network is unknown. The value of nnpfc_total_kilobyte_size shall be present in the range of 0 to $2^{32}-2$.

The nnpfc_reserved_zero_bit_b shall be equal to 0 in the bitstream. A decoder shall ignore an NNPFC SEI message in which nnpfc_reserved_zero_bit_b is not equal to 0.

The nnpfc_payload_byte[i] may include the i-th byte of the bitstream. The byte sequence nnpfc_payload_byte[i] for all existing values of i shall be a complete bitstream conforming to ISO/IEC 15938-17.

Neural-Network Post-Filter Activation (NNFPA)

The syntax structure for NNFPA is shown in Table 18.

TABLE 18

| | Descriptor |
|---|---|
| nn_post_filter_activation( payloadSize ) { | |
|   nnpfa_target_id | ue(v) |
|   nnpfa_cancel_flag | u(1) |
|   if( (nnpfa_cancel_flag ) | |
|     nnpfa_persistence_flag | u(1) |
| } | |

The NNPFA syntax structure in Table 18 may be signaled in the form of an SEI message. An SEI message signaling the NNPFA syntax structure in Table 18 may be referred to as an NNPFA SEI message.

An NNPFA SEI message may enable or disable possible use of a target neural-network post-processing filter (NNPF) identified by nnpfa_target_id for post-processing filtering of a picture set. For a specific picture in which the NNPF is activated, the target NNPF may be the NNPF specified by the last NNPFC SEI message with the same nnpfc_id as nnpfa_target_id. Here, the last NNPFC SEI message may precede the first VCL NAL unit of the current picture in decoding order and may not correspond to a repetition of an NNPFC SEI message including a base NNPF.

When an NNPF is used for a different purpose or filters a different color component, multiple NNPFA SEI messages may be present for the same picture.

The nnpfa_target_id may indicate a target NNPF associated with the current picture and specified by one or more NNPFC SEI messages having the same nnpfc_id as nnfpa_target_id.

The value of nnpfa_target_id shall be present in the range of 0 to $2^{32}-2$. A value in the range of 256 to 511 and the range of $2^{31}$ to $2^{32}-2$ for nnpfa_target_id may be reserved for future use. Decoders shall ignore an NNPFA SEI message with nnpfa_target_id value in the range of 256 to 511 or $2^{31}$ to $2^{32}-2$.

An NNPFA SEI message with a specific value of nnpfa_target_id shall not be present in the current PU unless one or both of the following conditions are true.

An NNPFC SEI message having the same nnpfc_id as the specific value of nnpfa_target_id, which is present in a PU preceding the current PU in decoding order, exists within the current CLVS.

An NNPFC SEI message having the same nnpfc_id as the specific value of nnpfa_target_id for the current PU exists.

When a PU includes both an NNPFC SEI message having a specific value of nnpfc_id and an NNPFA SEI message having an nnpfa_target_id equal to the specific value of nnpfc_id, the NNPFC SEI message shall precede the NNPFA SEI message in decoding order.

A value 1 of nnpfa_cancel_flag may indicate that the persistence of the target NNPF, set by arbitrary previous NNPFA SEI message having the same nnpfa_target_id as the current SEI message, is cancelled. In other words, the target NNPF shall no longer be used unless it is activated by another NNPFA SEI message having the same nnpfa_target_id as the current SEI message and an nnpfa_cancel_flag equal to 0. A value 0 of nnpfa_cancel_flag may indicate that nnpfa_persistence_flag follows.

The nnpfa_persistence_flag may indicate the persistence of the target NNPF for the current layer. A value 0 of nnpfa_persistence_flag may indicate that the target NNPF may be used only for post-processing filtering of the current picture. A value 1 of nnpfa_persistence_flag may indicate that the target NNPF may be used for post-processing filtering of the current picture and all subsequent pictures in the current layer in output order until one or more of the following conditions is true:

A new CLVS starts for the current layer.

The bitstream ends.

A picture in the current layer associated with an NNPFA SEI message having the same nnpfa_target_id as the current SEI message and an nnpfa_cancel_flag equal to 1 is output after the current picture in output order.

The target NNPF shall not be applied to a subsequent picture in the current layer that is associated with an NNPFA SEI message having the same nnpfa_target_id as the current SEI message and an nnpfa_cancel_flag equal to 1.

nnpfcTargetPictures may be a set of pictures related to the last NNPFC SEI message preceding the current NNPFA SEI message in decoding order and having the same nnpfc_id as nnpfa_target_id. nnpfaTargetPictures may be a set of pictures in which the target NNPF is activated by the current NNPFA SEI message. All arbitrary pictures included in nnpfaTargetPictures shall also be included in nnpfcTargetPictures.

Post-Filter Hint

The syntax structure for the post-filter hint is shown in Table 19.

TABLE 19

| | Descriptor |
|---|---|
| post_filter_hint( payloadSize ) { | |
| filter_hint_cancel_flag | u(1) |
| if( !filter_hint_cancel_flag ) { | |
| filter_hint_persistence_flag | u(1) |
| filter_hint_size_y | ue(v) |
| filter_hint_size_x | ue(v) |
| filter_hint_type | u(2) |
| filter_hint_chroma_coeff_present_flag | u(1) |
| for( cIdx = 0; cIdx < ( filter_hint_chroma_coeff_present_flag ? 3 : 1 ); cIdx++ ) | |
| for( cy = 0; cy < filter_hint_size_y; cy++ ) | |
| for( cx = 0; cx < filter_hint_size_x; cx++ ) | |
| filter_hint_value[ cIdx ][ cy ][ cx ] | se(v) |
| } | |
| } | |

The post-filter hint syntax structure in Table 19 may be signaled in the form of an SEI message. An SEI message signaling the post-filter hint syntax structure in Table 19 may be referred to as a post-filter hint SEI message.

The post-filter hint SEI message may provide a post-filter coefficient or correlation information regarding the design of the post-filter, in order to potentially use the decoded and output picture set for post-processing to achieve enhanced display quality.

A value 1 of filter_hint_cancel_flag may indicate that the SEI message cancels the persistence of a previous post-filter hint SEI message in output order to be applied to the current layer. A value 0 of filter_hint_cancel_flag may indicate that post-filter hint information follows.

The filter_hint_persistence_flag may indicate the persistence of the post-filter hint SEI message for the current layer. A value 0 of filter_hint_persistence_flag may indicate that the post-filter hint applies only to the currently decoded picture. A value 1 of filter_hint_persistence_flag may indicate that the post-filter hint SEI message applies to the currently decoded picture and persists for all subsequent pictures in the current layer in output order until one or more of the following conditions is true:

A new CLVS starts for the current layer.

The bitstream ends.

A picture in the current layer of an AU associated with a post-filter hint SEI message is output after the current picture in output order.

The filter_hint_size_y may indicate the vertical size of the filter coefficient or correlation array. The value of filter_hint_size_y shall be present in the range of 1 to 15.

The filter_hint_size_x may indicate the horizontal size of the filter coefficient or correlation array. The value of filter_hint_size_x shall be present in the range of 1 to 15.

The filter_hint_type may indicate the type of the transmitted filter hint, as shown in Table 20. The value of filter_hint_type shall be present in the range of 0 to 2. A value of filter_hint_type equal to 3 shall not be present in the bitstream. Decoders shall ignore a post-filter hint SEI message with filter_hint_type equal to 3.

TABLE 20

| Value | Description |
|---|---|
| 0 | Coefficients of a 2D-FIR filter |
| 1 | Coefficients of two 1D-FIR filters |
| 2 | Cross-correlation matrix |

A value 1 of filter_hint_chroma_coeff_present_flag may indicate that filter coefficients for chroma are present. A value 0 of filter_hint_chroma_coeff_present_flag may indicate that filter coefficients for chroma are not present.

The filter_hint_value[cIdx][cy][cx] may represent a filter coefficient or a cross-correlation matrix element between the original signal and the decoded signal, with 16-bit precision. The value of filter_hint_value[cIdx][cy][cx] shall be present in the range of $-2^{31+1}$ to $2^{31}-1$. The variable cIdx may indicate the corresponding color component, cy may indicate the counter in the vertical direction, and cx may indicate the counter in the horizontal direction. Depending on the value of filter_hint_type, the following may apply.

When the value of filter_hint_type is 0, coefficients of a two-dimensional Finite Impulse Response (FIR) filter of size filter_hint_size_y×filter_hint_size_x may be transmitted.

Otherwise, when the value of filter_hint_type is 1, filter coefficients of two one-dimensional FIR filters may be transmitted. In this case, the value of filter_hint_size_y shall be 2. An index cy equal to 0 may indicate the filter coefficients of the horizontal filter, and a cy equal to 1 may indicate the filter coefficient of the vertical filter. In the filtering process, the horizontal filter may be applied first, and the result may then be filtered by the vertical filter.

Otherwise (i.e., when the value of filter_hint_type is 2), the transmitted hint may represent a cross-correlation matrix between the original signal s and the decoded signal s'.

A normalized cross-correlation matrix for the color component identified by cIdx, with a size of filter_hint_size_y× filter_hint_size_x, may be defined as in Equation 6.

$$\text{filter\_hint\_value}(cIdx, cy, cx) = \frac{1}{\left(2^{8\div bitDepth}-1\right)^2 * h * w} \sum_{m=0}^{h-1}\sum_{n=0}^{w-1} s(m, n) * s'(m + cy - OffsetY, n + cx - OffsetX) \quad \text{[Equation 6]}$$

In Equation 6, s indicates the sample array of the color component cIdx of the original picture, s' indicates the corresponding array of the decoded picture, h indicates the vertical height of the relevant color component, w indicates the horizontal width of the relevant color component, and bitDepth indicates the bit depth of the color component. In addition, OffsetY is equal to (filter_hint_size_y>>1), OffsetX is equal to (filter_hint_size_x>>1), the range of cy is 0<=cy<filter_hint_size_y, and the range of cx is 0<=cx<filter_hint_size_x.

A decoder may derive a Wiener post-filter from the cross-correlation matrix between the original signal and the decoded signal and the auto-cross-correlation matrix of the decoded signal.

Problems of the Previous Art

According to the conventional NNPFC SEI message design, the size of an input picture is not signaled through the NNPFC SEI message and may be given as an available input picture size. In other words, the available input picture size may be derived. However, even though only one picture size is given, an NNPF may be designed to take multiple input pictures. In other words, the NNPF may receive multiple input pictures as input. Furthermore, the input bitstream may be encoded such that multiple picture resolutions (i.e., sizes) are present in the encoded video sequence of the bitstream. As an example, in Versatile Video Coding (VVC), reference picture resampling (RPR) may be supported.

In this regard, some may be assumed that the input pictures of the NNPF defined by the NNPFC SEI message are implicitly restricted to have the same size because only one input picture size is given. Alternatively, others may interpret in creative manners that pictures of various picture sizes to be used as input of the NNPF. For example, when the size of an input picture is greater than the given input picture size, a subset of the input picture may be used as input to the NNPF. Here, the subset may refer to a region starting from the top-left point of the input picture to the given input picture width and height. However, to avoid errors in the use and implementation of the SEI message, such issues should be addressed. In other words, problems such as diversity in interpretation and ambiguity need to be resolved.

Embodiment

The present disclosure proposes various embodiments to address the problems described above. The embodiments proposed by the present disclosure may be implemented individually or in combination with one another.

Embodiment 1. When the number of input pictures of the NNPF is plural, the multiple input pictures are restricted to have the same size (i.e., resolution).

Embodiment 2. When the NNPF is activated by an NNPFA SEI message and the input pictures of the NNPF (i.e., specified by the NNPFC SEI message) are plural, all input pictures of the NNPF are restricted to have the same size (i.e., resolution) as the current picture (i.e., the picture in the same access unit including the NNPFA SEI message).

Embodiment 3. When the NNPF is activated by an NNPFA SEI message and the input pictures of the NNPF (i.e., specified by the NNPFC SEI message) are plural, when one or more input picture sizes (i.e., resolutions) are different from the size (i.e., resolution) of the current picture, a resampling process is applied to the input picture in order to make the size (i.e., resolution) of the input picture equal to the size (i.e., resolution) of the current picture. Hereinafter, the embodiments are described in detail.

Embodiment 1

According to Embodiment 1, as shown in Table 21 below, nnpfc_num_input_pics_minus1+1 may indicate the number of decoded output pictures used as an input to the NNPF. The value of nnpfc_num_input_pics_minus1 may be restricted to be present in a range of 0 to 63. When nnpgc_purpose & 0x8 is not equal to 0, the value of nnpfc_num_input_pics_minus1 may be greater than 0. When the value of nnpfc_num_input_pics_minus1 is greater than 0, all input pictures of the NNPF may be restricted to have the same width and/or height. In other words, when the value of nnpfc_num_input_pics_minus1 is greater than 0, all input pictures of the NNPF may be restricted to have the same size (i.e., resolution).

TABLE 21

| |
|---|
| nnpfc_num_input_pics_minus1 plus 1 specifies the number of decoded output pictures used as input for the NNPF. The value of nnpfc_num_input_pics_minus1 shall be in the range of 0 to 63, inclusive. When nnpfc_purpose & 0x08 is not equal to 0, the value of nnpfc_num_input_pics_minus1 shall be greater than 0. When nnpfc_num_input_pics_minus1 is greater than 0, it is constrained that all input pictures of the NNPF shall have the same width and height. |

Embodiment 2

According to Embodiment 2, as shown in Table 22 below, when input pictures of the target NNPF are plural, all input pictures may be restricted to have the same resolution (i.e., size) as the resolution (i.e., size) of the current picture.

TABLE 22

| 8.29.1 Neural-network post-filter activation SEI message semantics |
|---|
| The neural-network post-filter activation (NNPFA) SEI message activates or de-activates the possible use of the target neural-network post-processing filter (NNPF), identified by nnpfa_target_id, for post-processing filtering of a set of pictures. For a particular picture for which the NNPF is activated, the following applies:<br>- The target NNPF is the NNPF specified by the last NNPFC SEI message with nnpfc_id equal to nnpfa_target_id, that precedes the first VCL NAL unit of the current picture in decoding order that is not a repetition of the NNPFC SEI message that contains the base NNPF.<br>NOTE 1 - There can be several NNPFA SEI messages present for the same picture, for example, when the NNPFs are meant for different purposes or for filtering of different colour components.<br>- If the target NNPF takes multiple input pictures, all input pictures shall have the same resolution as the resolution of the current picture.<br>... |

Embodiment 3

According to Embodiment 3, when the NNPF is activated by the NNPFA SEI message and input pictures of the NNPF (i.e., specified by the NNPFC SEI message) are plural, a resampling process may be applied to the input picture. Specifically, when one or more input picture sizes (i.e., resolutions) are different from the size (i.e., resolution) of the current picture, the resampling process may be applied to the input picture to change the size (i.e., resolution) of an input picture to be the same as the size (i.e., resolution) of the current picture.

TABLE 23

| 8.29.2 Neural-network post-filter activation SEI message semantics |
|---|
| The neural-network post-filter activation (NNPFA) SEI message activates or de-activates the possible use of the target neural-network post-processing filter (NNPF), identified by nnpfa_target_id, for post-processing filtering of a set of pictures. For a particular picture for which the NNPF is activated, the target NNPF is the NNPF specified by the last NNPFC SEI message with nnpfc_id equal to nnpfa_target_id, that precedes the first VCL NAL unit of the current picture in decoding order that is not a repetition of the NNPFC SEI message that contains the base NNPF.<br>NOTE 1 - There can be several NNPFA SEI messages present for the same picture, for example, when the NNPFs are meant for different purposes or for filtering of different colour components.<br>NOTE 2 - When an NNPF is activated by an NNPFA SEI message and the NNPF takes / uses multiple input pictures (i.e., as specified by NNPFC SEI message), if one of more of the input pictures have size / resolution that is different from the size of the current picture, a resampling process is applied to the input pictures to change their size / resolution to be the same as that of the current picture. |

Hereinafter, an image encoding/decoding method according to the present embodiment is described.

Figure 5:
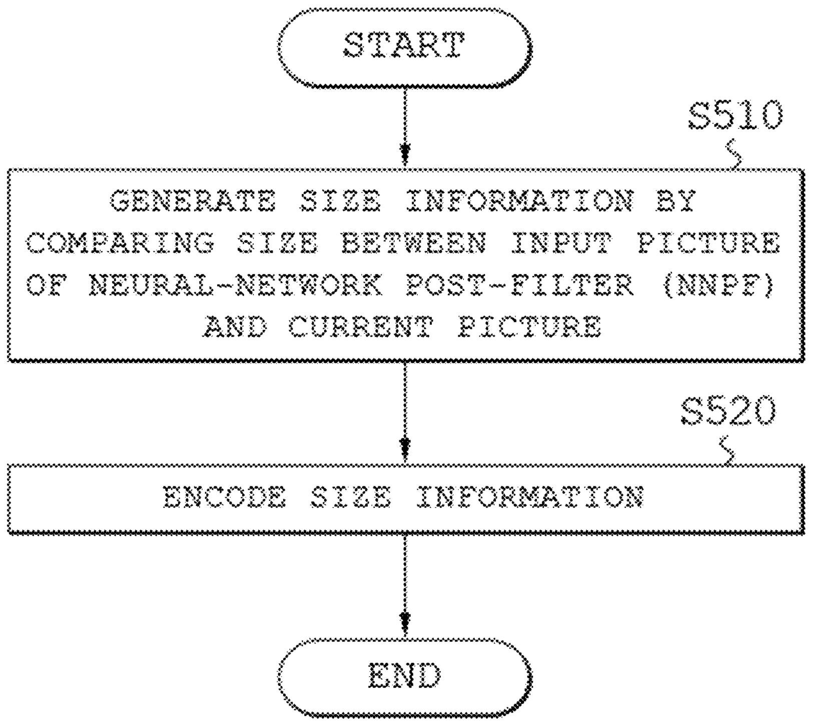
FIG. 5 is an encoding flowchart according to an embodiment of the present disclosure.

FIG. 5 is an encoding flowchart according to an embodiment of the present disclosure. An image encoding apparatus 100 may generate size information by comparing the size of an input picture of the NNPF with the size of the current picture S510. Here, the size information may be size information of the input picture. Alternatively, the size information may be size information of the current picture. Alternatively, the size information may be a difference between the size of the input picture and the size of the current picture. Accordingly, the image encoding apparatus 100 may encode the size information S520.

Figure 6:
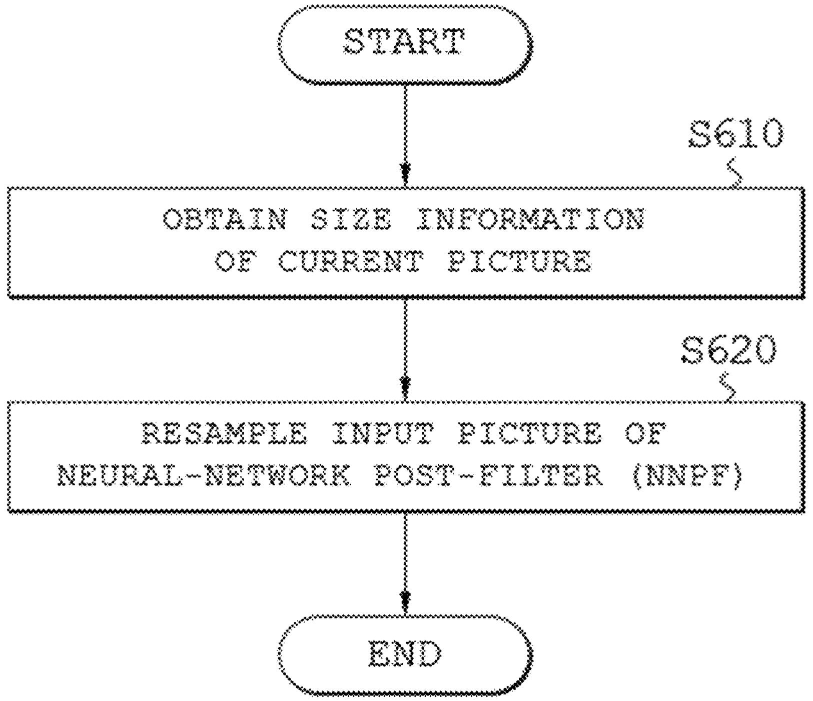
FIG. 6 is a decoding flowchart according to an embodiment of the present disclosure.

FIG. 6 is a decoding flowchart according to an embodiment of the present disclosure. An image decoding apparatus 200 may obtain size information of the current picture S610. Here, the size information may include at least one of width information of the current picture or height information of the current picture. Alternatively, the size information may be resolution information.

The image decoding apparatus 200 may resample an input picture of the NNPF S620. Specifically, the image decoding apparatus 200 may resample the input picture of the NNPF based on the size information. In this case, the resampling may be performed based on the size of a current picture and the size of an input picture being different. In addition, the resampling may be performed based on the input picture of the NNPF being two or more. In other words, the resampling may be performed when the input pictures of the NNPF are multiple.

According to an embodiment of the present disclosure, when an NNPF SEI message is applied to the current picture, the NNPF may be activated based on the NNPFA SEI message included in the NNPF SEI message by the image decoding apparatus 200.

The exemplary methods of the present disclosure are described as a series of operations for clarity of explanation, but this is not intended to limit the order in which the operations are performed, and each operation may be performed simultaneously or in a different order when necessary. To implement the method according to the present disclosure, the exemplary steps may include additional steps, exclude some of the steps and include the remaining steps, or exclude some of the steps and include additional other steps.

In the present disclosure, an image encoding apparatus or image decoding apparatus that performs a predetermined operation (step) may perform an operation (step) of checking a condition or situation for performing the operation (step). For example, when it is described that a predetermined operation is performed when a predetermined condition is satisfied, the image encoding apparatus or image decoding apparatus may perform an operation of checking whether the predetermined condition is satisfied and then perform the predetermined operation.

The various embodiments of the present disclosure are not a list of all possible combinations, but are intended to describe representative aspects of the present disclosure, and the elements described in the various embodiments may be applied independently or in any combination of two or more.

In addition, the various embodiments of the present disclosure may be implemented by hardware, firmware, software, or a combination thereof. In the case of hardware implementation, it may be implemented by one or more of application specific integrated circuits (ASICs), digital signal processors (DSPs), digital signal processing devices (DSPDs), programmable logic devices (PLDs), field programmable gate arrays (FPGAs), general processor, controller, microcontroller, microprocessor, etc.

In addition, the image decoding apparatus and image encoding apparatus to which the embodiments of the present disclosure are applied may be included in multimedia broadcasting transceiver, mobile communication terminal, home cinema video device, digital cinema video device, surveillance camera, video conferencing device, real-time communication device such as video telephony, mobile streaming device, storage media, camcorder, video-on-demand (VOD) service provision device, over-the-top (OTT) video device, internet streaming service provision device, three-dimensional (3D) video device, video telephony device, medical video device, etc. and may be used for processing a video signal or a data signal. For example, OTT video devices may include game console, Blu-ray player, internet-connected TV, home theater system, smartphone, tablet PC, digital video recorder (DVR), etc.

Figure 7:
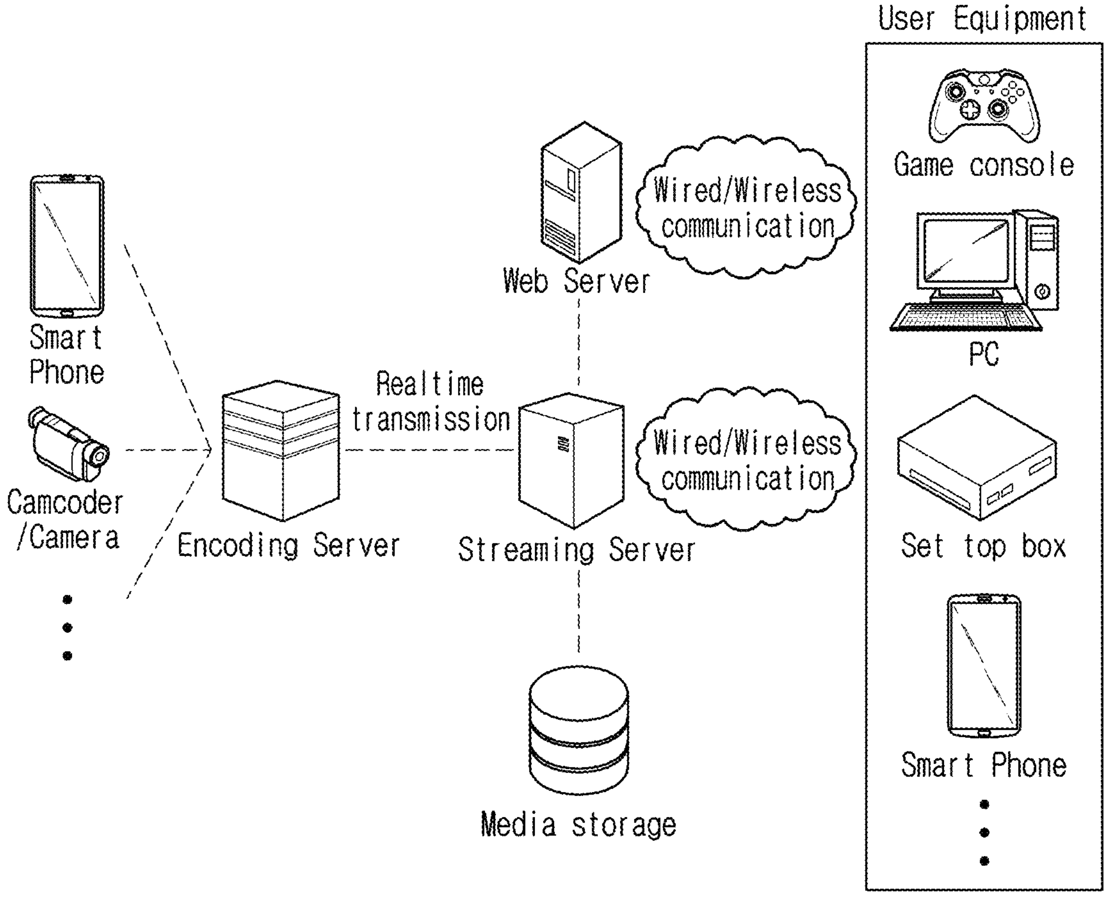
FIG. 7 shows an exemplary diagram of a content streaming system to which an embodiment of the present disclosure may be applied.

FIG. 7 shows an exemplary diagram of a content streaming system to which an embodiment of the present disclosure may be applied.

As shown in FIG. 7, the content streaming system to which an embodiment of the present disclosure is applied may broadly include an encoding server, a streaming server, a web server, a media storage, a user device, and a multimedia input device.

The encoding server compresses content input from multimedia input devices such as a smartphone, camera, or camcorder into digital data, generating a bitstream and transmitting it to the streaming server. As another example, when multimedia input devices such as a smartphone, camera, or camcorder directly generate a bitstream, the encoding server may be omitted.

The bitstream may be generated by the video encoding method and/or the image encoding apparatus to which an embodiment of the present disclosure is applied, and the streaming server may temporarily store the bitstream during the process of transmitting or receiving the bitstream.

The streaming server may transmit multimedia data to a user device based on a user request through the web server, and the web server may serve as an intermediary that informs user of available service. When a user requests a desired service from the web server, the web server may send the request to the streaming server, and the streaming server may transmit the multimedia data to the user. In this case, the content streaming system may include a separate control server, and in this case, a control server may function to control command/response exchanges between devices within the content streaming system.

The streaming server may receive content from a media storage and/or an encoding server. For example, when receiving content from the encoding server, the content may be received in real time. In this case, to provide a seamless streaming service, the streaming server may store the bitstream for a certain period of time.

Examples of the user device may include a mobile phone, a smartphone, a laptop computer, a digital broadcasting terminal, a personal digital assistant (PDA), a portable multimedia player (PMP), a navigation device, a slate PC, a tablet PC, an ultrabook, a wearable device (i.e., a smartwatch, a smart glass, a head-mounted display (HMD)), a digital TV, a desktop computer, and digital signage.

Each server within the content streaming system may be operated as a distributed server, in which case the data received by each server may be processed in a distributed manner.

The range of the present disclosure includes software or machine-executable instructions (i.e., an operating system, an application, firmware, a program, etc.) that enable operations according to the methods of various embodiments to be executed on a device or computer, and a non-transitory computer-readable medium in which such software or instructions are stored and executable on a device or computer.

The embodiments of the present disclosure may be used for encoding/decoding an image.

What is claimed is:

1. An image decoding method performed by an image decoding apparatus, the image decoding method comprising:

determining whether a number of input pictures for a neural-network post-filter (NNPF) is greater than 1;

based on the number of the input pictures for the NNPF being greater than 1, determining whether at least one input picture, among a plurality of the input pictures, has a size that is different from a size of a current picture; and based on the at least one input picture having the size that is different from the size of the current picture, resampling the at least one input picture so that the size of the at least one input picture is the same as the size of the current picture.

2. The image decoding method of claim 1, further comprising:

obtaining an NNPF supplemental enhancement information (SEI) message, wherein, based on the NNPF SEI message being applied to a current picture, the NNPF is determined based on a neural-network post-filter activation (NNPFA) SEI message included in the NNPF SEI message.

* * * * *